United States Patent (10) Patent No.: US 9,991,960 B2
Liu et al. (45) Date of Patent: *Jun. 5, 2018

(54) OPTICAL RECEIVER WITH OPTICAL TRANSMITTER-SPECIFIC DISPERSION POST-COMPENSATION

(71) Applicant: Futurewei Technologies, Inc., Plano, TX (US)

(72) Inventors: Xiang Liu, Marlboro, NJ (US); Frank Effenberger, Colts Neck, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/722,948

(22) Filed: Oct. 2, 2017

(65) Prior Publication Data

US 2018/0026719 A1 Jan. 25, 2018

Related U.S. Application Data

(63) Continuation of application No. 14/503,569, filed on Oct. 1, 2014, now Pat. No. 9,806,813.

(51) Int. Cl.
*H04B 10/60* (2013.01)
*H04B 10/27* (2013.01)
(Continued)

(52) U.S. Cl.
CPC ....... *H04B 10/2513* (2013.01); *H04B 10/614* (2013.01); *H04B 10/6161* (2013.01)

(58) Field of Classification Search
CPC .............. H04B 10/2513; H04B 10/614; H04B 10/6161
(Continued)

(56) References Cited

U.S. PATENT DOCUMENTS 4,288,873 A 9/1981 Gingell
6,498,929 B1 12/2002 Tsurumi et al.
(Continued)

FOREIGN PATENT DOCUMENTS

CN 102315882 A 1/2012
CN 102983910 A 3/2013
(Continued)

OTHER PUBLICATIONS

Domanic Lavery et al.,"Digital Coherent Receivers for Long-Reach OpticalAccess Networks",Journal of Lightwave Technology, vol. 31, No. 4, dated Feb. 15, 2013, total 12 pages.
(Continued)

*Primary Examiner* — Ken N Vanderpuye
*Assistant Examiner* — Dibson Sanchez
(74) *Attorney, Agent, or Firm* — Futurewei Technologies, Inc.

(57) ABSTRACT

An apparatus comprises a polarization-diversity optical hybrid that converts an optical signal into a plurality of optical signals comprising a first polarization component and a second polarization component orthogonal to the first polarization component, one or more detectors that convert the plurality of optical signals into a plurality of first analog electrical signals, DC blocking elements that remove DC signal components to output a plurality of second analog electrical signals, analog to digital converters (ADCs) coupled to the DC blocking elements that convert the plurality of second analog electrical signals into a plurality of digital signals, and a digital signal processing (DSP) unit coupled to the ADCs. The DSP is configured to perform a fiber dispersion compensation on the plurality of digital signals and add DC offsets to output a plurality of DC-restored compensated digital signals.

20 Claims, 16 Drawing Sheets

(51) Int. Cl.
*H04J 14/00* (2006.01)
*H04B 10/2513* (2013.01)
*H04B 10/61* (2013.01)

(58) Field of Classification Search
USPC .............. 398/58–64, 66–75, 159, 202–214
See application file for complete search history.

(56) References Cited

U.S. PATENT DOCUMENTS

| | | |
|---|---|---|
| 6,917,031 B1 | 7/2005 | Sun et al. |
| 7,058,311 B1 | 6/2006 | Islam et al. |
| 7,477,709 B2 | 1/2009 | Park et al. |
| 8,073,343 B2 * | 12/2011 | Yuki ............... H04B 10/0797 398/202 |
| 2001/0016002 A1 | 8/2001 | Shim et al. |
| 2002/0089728 A1 | 7/2002 | Kim |
| 2003/0174386 A1 | 9/2003 | Oikawa et al. |
| 2005/0196176 A1 | 9/2005 | Sun et al. |
| 2006/0002706 A1 | 1/2006 | Lee et al. |
| 2006/0217069 A1 * | 9/2006 | Chen ................. H04B 1/30 455/63.1 |
| 2007/0092259 A1 | 4/2007 | Bontu et al. |
| 2007/0147850 A1 | 6/2007 | Savory et al. |
| 2008/0089685 A1 | 4/2008 | Kazawa et al. |
| 2009/0226189 A1 | 9/2009 | Ito |
| 2009/0274470 A1 | 11/2009 | Yoshino et al. |
| 2010/0254718 A1 | 10/2010 | Oda et al. |
| 2011/0020002 A1 | 1/2011 | Yoon et al. |
| 2011/0026940 A1 | 2/2011 | Komaki |
| 2011/0255866 A1 | 10/2011 | Van Veen et al. |
| 2011/0318019 A1 | 12/2011 | Nissov et al. |
| 2012/0002979 A1 | 1/2012 | Xie |
| 2012/0057884 A1 | 3/2012 | Zhao et al. |
| 2012/0099865 A1 | 4/2012 | Ishii et al. |
| 2012/0134676 A1 | 5/2012 | Kikuchi |
| 2012/0251118 A1 * | 10/2012 | McNicol ............. H04B 10/61 398/82 |
| 2012/0308233 A1 | 12/2012 | Hironishi et al. |
| 2013/0071109 A1 * | 3/2013 | Khatana ............ H04B 10/615 398/38 |
| 2013/0230313 A1 | 9/2013 | Yan et al. |
| 2014/0056585 A1 | 2/2014 | Qian et al. |
| 2014/0294388 A1 | 10/2014 | Odaka et al. |
| 2014/0334831 A1 | 11/2014 | Kawazoe et al. |
| 2016/0006510 A1 | 1/2016 | Chen et al. |
| 2016/0329960 A1 * | 11/2016 | Yao .................. H04B 10/61 |

FOREIGN PATENT DOCUMENTS

| | | |
|---|---|---|
| CN | 103812562 A | 5/2014 |
| EP | 2922219 A2 | 9/2015 |

OTHER PUBLICATIONS

Peter Ossieur et al., "A 10G linear burst-mode receiver supporting electronic dispersion compensation for extended-each optical links", Optics Express, vol. 19, No. 26, dated Dec. 1, 2011, total 7 pages.

S. Kawanishi et al, "Single channel 400Gbit/s time-division multiplexed transmission of 0.98ps pulses over 40 km employing dispersion slope compensation", Electronic Letters vol. 32 No. 10, dated May 1996, pp. 916-918.

Dayou Qian et al., "A 105km Reach Fully Passive 10G-PON using a Novel Digital OLT",ECOC Technical Digest, dated Sep. 2012, total 3 pages.

* cited by examiner

OPTICAL RECEIVER WITH OPTICAL TRANSMITTER-SPECIFIC DISPERSION POST-COMPENSATION

CROSS-REFERENCE TO RELATED APPLICATIONS

This application is a continuation of U.S. patent application Ser. No. 14/503,569 filed on Oct. 1, 2014. The subject matter of the afore-mentioned patent application is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical access networks may be employed to deliver a wide variety of services, such as fiber to the home (FTTH), fiber to the building (FTTB), enterprise connectivity, business connectivity, and mobile back-haul and front-haul for fourth generation (4G) and/or next generation wireless communication. Continuous demands for higher network capacities and greater distance coverages pose challenges in current and future optical access network designs. For example, the effect of fiber transmission impairments may become more severe as the optical transmission speed and the transmission distance increase. Fiber transmission impairments may include chromatic dispersion (CD), polarization mode dispersion (PMD), phase noise, and non-linear effects. However, CD may be one of the most performance limiting factors, especially for high-speed transmissions at long distances.

CD may cause different spectral components (e.g., wavelengths) in an optical signal to travel through an optical fiber at different speeds and arrive at a receiver at different time instants (e.g., with different delays), and thus may temporally broaden the optical pulses that carry the data and lead to inter-symbol interference (ISI). Some systems may compensate CD in a fiber by employing another fiber of opposite-sign dispersion, but may be at the expense of increased loss, complexity, and cost. Recent advances in high-speed analog-to-digital converters (ADCs), high-speed digital-to-analog converters (DACs), and high-performance digital signal processors (DSPs) have enabled fiber-optic impairments to be compensated digitally by DSPs.

The dispersion effect experienced by an optical signal when traveling through a given optical fiber link may be compensated through dispersion post-compensation by an amount that is nominally the opposite of the fiber link dispersion. However, in typical optical access networks, optical network units (ONUs) may send time-division-multiplexed (TDM) signal blocks to an optical line terminal (OLT) at a central office, where the ONUs may be located at different distances away from the OLT. As such, the TDM blocks that are originated from different ONUs may experience different fiber link dispersions, and thus the OLT may not employ the same fiber dispersion post-compensation for all the TDM blocks. In addition, intensity modulation may be commonly employed at the ONUs' transmitters, thus the OLT may require an optical transmitter-specific dispersion post-compensation scheme that is suitable for compensating intensity modulated signals.

SUMMARY

In one embodiment, the disclosure includes an apparatus comprising a frontend configured to convert an optical intensity-modulated (IM) signal associated with a remote optical transmitter into a plurality of analog electrical signals, determine a plurality of direct current (DC) offsets for the analog electrical signals, remove the DC offsets from the analog electrical signals to produce a plurality of DC-free analog signals, and convert the DC-free analog signals into a plurality of DC-free digital signals, and a DSP unit coupled to the frontend and configured to perform fiber dispersion compensation on the DC-free digital signals according to a dispersion value associated with the remote optical transmitter to produce a plurality of DC-free compensated digital signals, and add the DC offsets to the compensated digital signals to produce a plurality of DC-restored compensated digital signals.

In another embodiment, the disclosure includes a method for use in an optical communication device comprising receiving a first optical IM signal from a first remote optical transmitter, receiving a second optical IM signal from a second remote optical transmitter, converting the first optical IM signal into a plurality of first digital electrical signals, converting the second optical IM signal into a plurality of second digital electrical signals, compensating the first digital electrical signals according to a first dispersion value associated with the first remote optical transmitter to produce a plurality of first compensated digital electrical signals, and compensating the second digital electrical signals according to a second dispersion value associated with the second remote optical transmitter to produce a plurality of second compensated digital electrical signals.

In yet another embodiment, the disclosure includes a method for use in an optical communication device comprising receiving a transmission schedule comprising a plurality of transmission time slots, wherein the transmission schedule provides an assigned time slot to the device, and wherein the transmission schedule comprises a guard interval (GI) that is based on a CD associated with the device, converting a digital signal sequence into an optical signal by performing an intensity modulation; and transmitting the optical signal in the assigned time slot.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
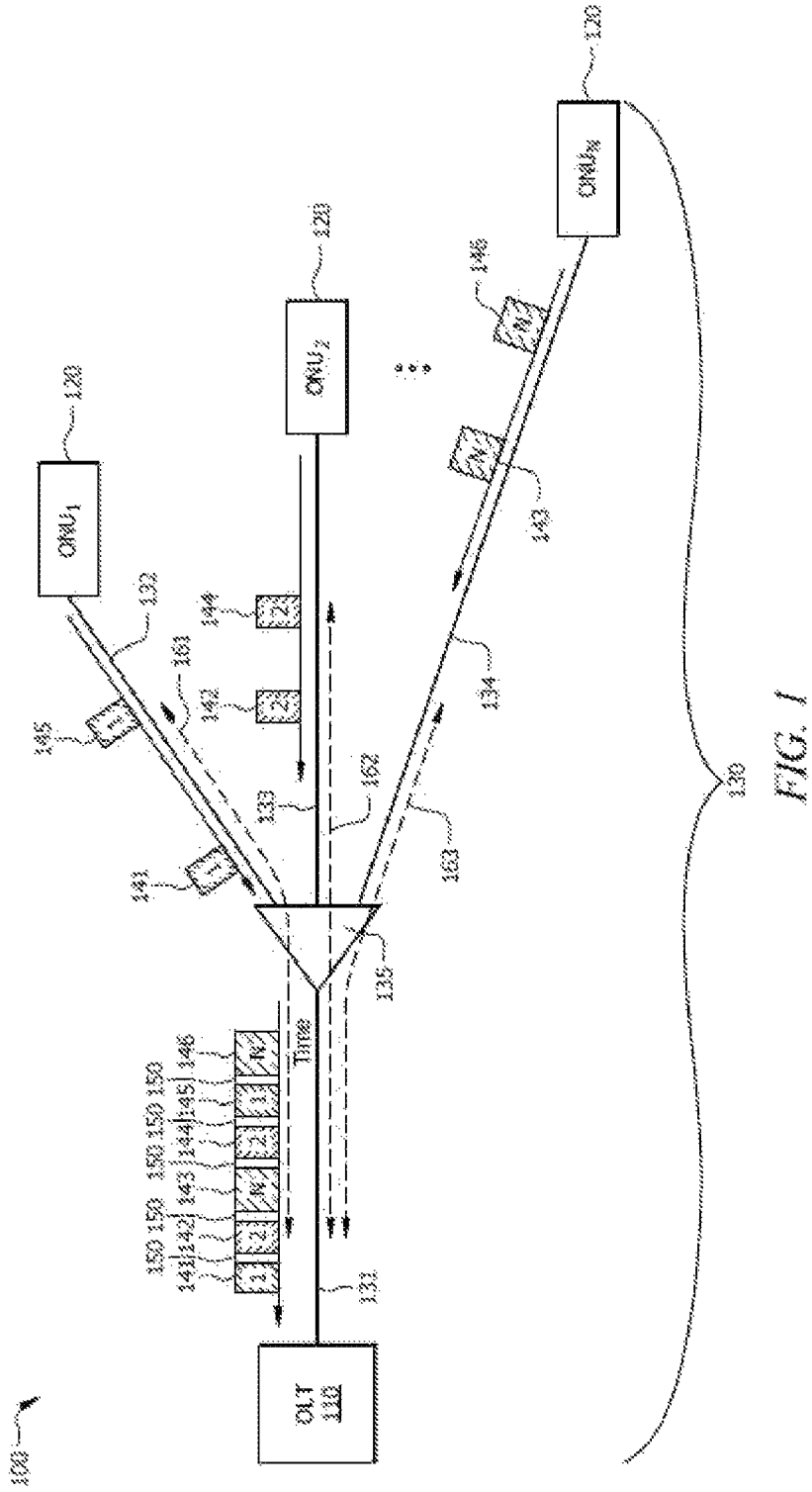
FIG. 1 is a schematic diagram of a passive optical network (PON) according to an embodiment of the disclosure.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

The demand for high-speed, wide-coverage optical access has been growing rapidly. Some research may focus on mitigating the performance limiting CD effect in long-distance optical fiber links. CD compensation may be performed at a direction detection receiver or a coherent detection receiver. Direct detection may refer to the recovery of amplitude information from a received optical carrier signal, whereas coherent detection may refer to the recovery of amplitude and phase information from the received optical carrier signal. For example, a direct detection receiver may perform CD compensation as described in P. Ossieur, et al., "A 10G linear burst-mode receiver supporting electronic dispersion compensation for extended-reach optical links," Optics Express, Vol. 19, No. 26, Dec. 12, 2011 (Ossieur), which is incorporated herein by reference, in which the CD compensation is performed via a 9-tap feedforward equalizer (FFE) and a 4-tap decision feedback equalizer (DFE). As shown in Ossieur, by performing the CD compensation at the direct detection receiver, the CD-limited transmission distance for a 10 gigabits per second (Gbps) signal may be extended by about 20 percent (%). However, the extended distance may not be sufficient to support a 40 Gbps transmission rate over a distance of about 10 kilometers (km).

Alternatively, a coherent detection receiver may perform CD compensation as described in D. Lavery, et al., "Digital coherent receivers for long-reach optical access networks," Journal of Lightwave Technology, Vol. 13, No. 4, Feb. 15, 2013, which is incorporated herein by reference, in which optical network units (ONUs) may transmit polarization-division multiplexed quadrature phase-shift keying (PDM-QPSK) signals and an optical line terminal (OLT) may employ a coherent detection receiver to compensate the PDM-QPSK signals for CD. However, current ONUs may employ conventional optical transmitters that are built for intensity modulation, which may refer to the use of light intensity to carry information, for example, by varying the optical power of an optical signal. Thus, the employment of PM-QPSK modulation may increase the complexity and the cost of current ONUs. In addition, PDM-QPSK transmitters may require additional optical amplifiers due to the higher loss associated with PDM-QPSK modulation, and thus may further increase the cost and the size of current ONUs.

Disclosed herein are techniques for performing post-EDC at an optical receiver according to a transmitter-specific or link-dependent fiber dispersion effect. The disclosed post-EDC techniques may be applied to optical IM signals that are transmitted by conventional optical transmitters for removing fiber dispersion effect. The disclosed post-EDC techniques may operate on the electric (E)-field of a received optical IM signal and may be suitable for signals with any modulation format, such as on-off keying (OOK), n-level PAM (n-PAM), orthogonal frequency-division multiplexing (OFDM), discrete multi-tone (DMT), duobinary, differential phase-shift keying (DPSK), differential quadrature phase-shift keying (DQPSK), or other modulation formats that may be generated by simple transmitters. In addition, the disclosed post-EDC techniques may be applicable to polarization-division multiplexed (PDM) signals. In an embodiment, an OLT may determine an amount of fiber dispersion for each connected ONU and may perform post-EDC on each received US signal to remove about all the fiber dispersion effect in an optical transport link between the OLT and the ONU that transmitted the US signal, where US may refer to the direction in which data may be transferred from the ONUs to the OLT 110. To further reduce the fiber dispersion effect, the OLT may design US transmission schedules with GIs inserted between adjacent US transmission time slots. The disclosed embodiments may implement the post-EDC at a coherent optical receiver comprising a polarization-diversity optical hybrid coupled to a DSP unit. The polarization-diversity optical hybrid may be configured to convert a received optical IM signal into two orthogonal polarizations. The DSP unit may be configured to separately perform the post-EDC on each polarization and reconstruct the IM signal after the post-EDC. The coherent optical receiver may further comprise a DC controller configured to measure and remove DC offsets in the analog electrical domain, and the DSP unit may be further configured to restore the DC offsets when reconstructing the IM signal. By removing the DC offsets in the analog electrical domain, the disclosed embodiments may employ lower resolutions ADCs and DSPs. The disclosed embodiments may provide wide-coverage (e.g., up to about 100 km), high-speed (e.g., greater than about 10 Gbps) optical access with close to zero dispersion and may enable the ONUs to reuse existing resources or to upgrade with relatively small modifications. It should be noted that the present disclosure may describe the embodiments in the context of an OLT, but the disclosed embodiments may be applicable to receivers in ONUs or any other optical communication devices.

FIG. 1 is a schematic diagram of a PON 100 according to an embodiment of the disclosure. The PON 100 may comprise an OLT 110, a plurality of ONUs 120 (e.g., $ONU_1$, $ONU_2$, $ONU_N$), and an optical distribution network (ODN) 130, which may be coupled to the OLT 110 and the ONUs 120. The PON 100 may be a communication network that does not require any active components to distribute data between the OLT 110 and the ONUs 120. Instead, the PON 100 may use the passive optical components in the ODN 130 to distribute data between the OLT 110 and the ONUs 120. The PON 100 may be a Next Generation Access (NGA) system, such as a ten Gbps gigabit PON (XGPON), which may have a downstream (DS) bandwidth of about ten Gbps and an upstream bandwidth of at least about 2.5 Gbps. Alternatively, the PON 100 may be any Ethernet-based network, such as an Ethernet passive optical network (EPON), a 10 Gigabit EPON (10GEPON), an asynchronous transfer mode PON (APON), a broadband PON (BPON), a gigabit PON (GPON), or a wavelength division multiplexed (WDM) PON (WPON).

The OLT 110 may be any device configured to communicate with the ONUs 120 and another backbone network (e.g., the Internet). Specifically, the OLT 110 may act as an intermediary between the backbone network and the ONUs 120. For instance, the OLT 110 may forward data received from the backbone network to the ONUs 120, and forward data received from the ONUs 120 onto the backbone network. Although the specific configuration of the OLT 110 may vary depending on the type of PON 100, the OLT 110 may comprise an optical transmitter and an optical receiver. When the backbone network employs a network protocol, such as Ethernet or synchronous optical networking/synchronous digital hierarchy (SONET/SDH), that is different from the PON protocol used in the PON 100, the OLT 110 may comprise a converter that may convert the network protocol into the PON protocol. The OLT 110 converter may also convert the PON protocol into the network protocol. The OLT 110 may be located at a central location, such as a central office, but may be located at other locations as well.

The ODN 130 may be a data distribution system. For example, the ODN 130 may comprise a feeder fiber 131, a plurality of drop fibers 132, 133, and 134, and a splitter 135 that couples the feeder fiber 131 to the drop fibers 132, 133, and 134. The feeder fiber 131 and the drop fibers 132, 133, and 134 may be any optical fiber cables that transport optical signals. The splitter 135 may be any optical coupler (e.g., a directional coupler or a multi-mode interference (MMI) coupler) configured to split an optical signal into a plurality of portions, each carried via one of the drop fibers 132, 133, and 134. The ODN 130 may further comprise other distributors, couplers, and/or other equipment. As shown in FIG. 1, the ODN 130 may extend between the OLT 110 and the ONUs 120 via three optical transport links 161, 162, and 163. For example, the optical transport link 161 may transport optical signals between the OLT 110 and the $ONU_1$ 120 along the feeder fiber 131 and the drop fiber 132, the optical transport link 162 may transport optical signals between the OLT 110 and the $ONU_2$ 120 along the feeder fiber 131 and the drop fiber 133, and the optical transport link 163 may transport optical signals between the OLT 110 and the $ONU_N$ 120 along the feeder fiber 131 and the drop fiber 134. The optical transport links 161, 162, and 163 may be bi-directional links supporting both US and DS transmissions. US may refer to the direction in which data may be transferred from the ONUs 120 to the OLT 110, whereas DS may refer to the direction in which data may be transferred from the OLT 110 to the ONUs 120. It should be noted that the ODN 130 may be arranged as shown in FIG. 1 or in any other suitable arrangement.

The ONUs 120 may be any devices configured to communicate with the OLT 110 and a customer or an end-user. Specifically, the ONUs 120 may act as an intermediary between the OLT 110 and the customer. For instance, the ONUs 120 may forward data received from the OLT 110 to the customer, and forward data received from the customer to the OLT 110. Although the specific configuration of the ONUs 120 may vary depending on the type of PON 100, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to and from a customer device. The ONUs 120 may be located at distributed locations, such as the customer premises, but may be located at other locations as well.

In some embodiments, the PON 100 may be coupled to a coaxial network to form a hybrid access network, such as an Ethernet PON over coaxial (EPoC) network. In a hybrid access network, a coaxial line terminal (CLT) may act as an intermediary between the OLT 110 and coaxial network units (CNUs) that are connected to the coaxial network. The CLT may forward data received from the OLT 110 to the CNUs and forward data received from the CNUs to the OLT 110.

Each of the optical transport links 161, 162, and 163 may comprise a fiber dispersion effect due to the use of fibers 131, 132, 133, and 134 as transmission media and the different propagation velocities among different signal components along the fibers 131, 132, 133, and 134. For example, an ONU 120 may transmit an optical signal comprising a plurality of optical pulses, each carrying a data symbol, to the OLT 110. When the optical signal propagates along the optical transport links 161, 162, or 163, the CD effect may cause the optical pulses to spread in time, which may be referred to as the pulse broadening effect. Thus, the OLT 110 may receive adjacent optical pulses that are overlapped and adjacent data symbols that interfere with each other, which may be referred to as the ISI or the CD-induced interference. As such, the OLT 120 may not be able to recover the original data without error or may not recover the original data at all when the ISI is substantially strong. In order to reverse or remove the CD effect, the OLT 110 may compensate the received signal to account for the CD effect prior to performing data recovery. It should be noted that the CD effect may increase with fiber lengths and data speeds (e.g., baud rates).

Each of the optical transport links 161, 162, and 163 may comprise a different CD effect due to different fiber lengths, and thus the OLT 110 may receive US signals with different CD effects depending on the originating ONUs. One approach to compensating the US signals may be to account for the CD effect according to the originating ONUs 120. For example, each optical transport link 161, 162, and 163 may comprise an amount of CD represented by $D_1$, $D_2$, and $D_N$, respectively. When the OLT 110 receives a US signal from the $ONU_1$ 120 connecting to the OLT 110 via the optical link 161, the OLT 110 may compensate the US signal for a $D_1$ amount of CD. Similarly, when the OLT 110 receives a US signal from the $ONU_2$ 120 connecting to the OLT 110 via the optical link 162, the OLT 110 may compensate the US signal for a $D_2$ amount of CD, and when the OLT 110 receives a US signal from the $ONU_N$ 120 connecting to the OLT 110 via the optical link 163, the OLT 110 may compensate the US signal for a $D_3$ amount of CD. After the compensation, the US signals may comprise close to zero residual CD. The compensation may be referred to as post-EDC since the OLT 110's receiver may compensate a signal for CD in the electrical domain after the signal propagates through a dispersion-limited fiber link, such as the optical transport links 161, 162, or 163.

The OLT 110 may obtain the amount of CD in the optical transport links 161, 162, and 163 via several mechanisms. For example, the CD effect may be measured by test equipment during an initial set up or installation of an ONU 120 and input to the OLT 110, where the test equipment may send a test signal to the ONU 120 and measure the delay in the returned signal. Alternatively, the OLT 110 may measure the amount of CD when the ONU 120 joins the network during a network discovery phase by iteratively adjusting the amount of CD for pre-compensation and determining an optimum estimate for the amount of CD.

The OLT 110 may perform dynamic bandwidth allocation to assign US transmission bandwidths and DS transmission bandwidths to the ONUs 120. In an embodiment, the OLT 110 may employ a time-division multiple access (TDMA) scheme for US transmission. In the TDMA scheme, the US channel or transmission bandwidth may be shared among the ONUs 120 by dividing the US channel into a plurality of time slots 141, 142, 143, 144, 145, and 146, each designated for one of the ONUs 120. For example, the OLT 110 may assign the time slots 141 and 145 to a first of the ONUs 120 (e.g., $ONU_1$), the time slots 142 and 144 to a second of the ONUs 120 (e.g., $ONU_2$), and the time slots 143 and 146 to a third of the ONUs 120 (e.g., $ONU_N$). Each ONU 120 may transmit US data according to the time slot assignments. It should be noted that the OLT 110 may employ other access schemes, such as a wavelength-division multiple access (WDMA) scheme separately or in combination with the TDMA scheme to communicate with the ONUs 120. When the OLT 110 employs a WDM scheme in combination with the TDMA scheme, the OLT 110 may sort the ONUs 120 by wavelengths for CD compensation.

In addition to compensating DS signals to account for fiber dispersion, the OLT 110 may insert GIs 150 between each of the time slots 141-146 to further reduce the CD-induced interference, where the GIs 150 may be larger than the CD-induced pulse broadening duration, $\Delta T_{CD}$. For example, a symbol period may be represented by $T_S$, which may be based on the data speed or the baud rate, and the CD-induced interference may cause the symbol to span a period, $T_{CD}$, that is greater than $T_S$, where the CD-induced pulse broadening duration, $\Delta T_{CD}$, may be referred to as the difference between $T_{CD}$ and $T_S$ (e.g., $\Delta T_{CD}=T_{CD}-T_S$).

The OLT 110 may insert the GIs 150 with different durations between adjacent timeslots 141-146 according to the ONUs 120 that are assigned to the adjacent time slots. For example, each GI 150 may be configured to be a value larger than about 50% of the sum of the pulse broadening durations of the ONUs 120 that are assigned to the adjacent time slots as follows:

$$GI > 0.5 \times (\Delta TC_{CD}(i) + \Delta TC_{CD}(i+1)), \quad (1)$$

where $\Delta TC_{CD}(i)$ may represent the pulse broadening duration for a first ONU 120 assigned to a time slot i and $\Delta TC_{CD}(i+1)$ may represent the pulse broadening duration for a second ONU 120 assigned to a time slot i+1 subsequent to the time slot i.

Alternatively, all GIs 150 may be configured with a same duration that is larger than a mean of the pulse broadening durations for all ONUs 120 as follows:

$$GI > \text{mean}(\Sigma_i \Delta TC_{CD}(i)). \quad (2)$$

It should be noted that the OLT 110 may assign US transmission bandwidths and DS transmission bandwidths to the CLT by employing substantially similar scheduling mechanisms as for the ONUs 120. In addition, the OLT 110 may employ similar post-EDC mechanisms to compensate US signals received from the CLT.

Figure 2:
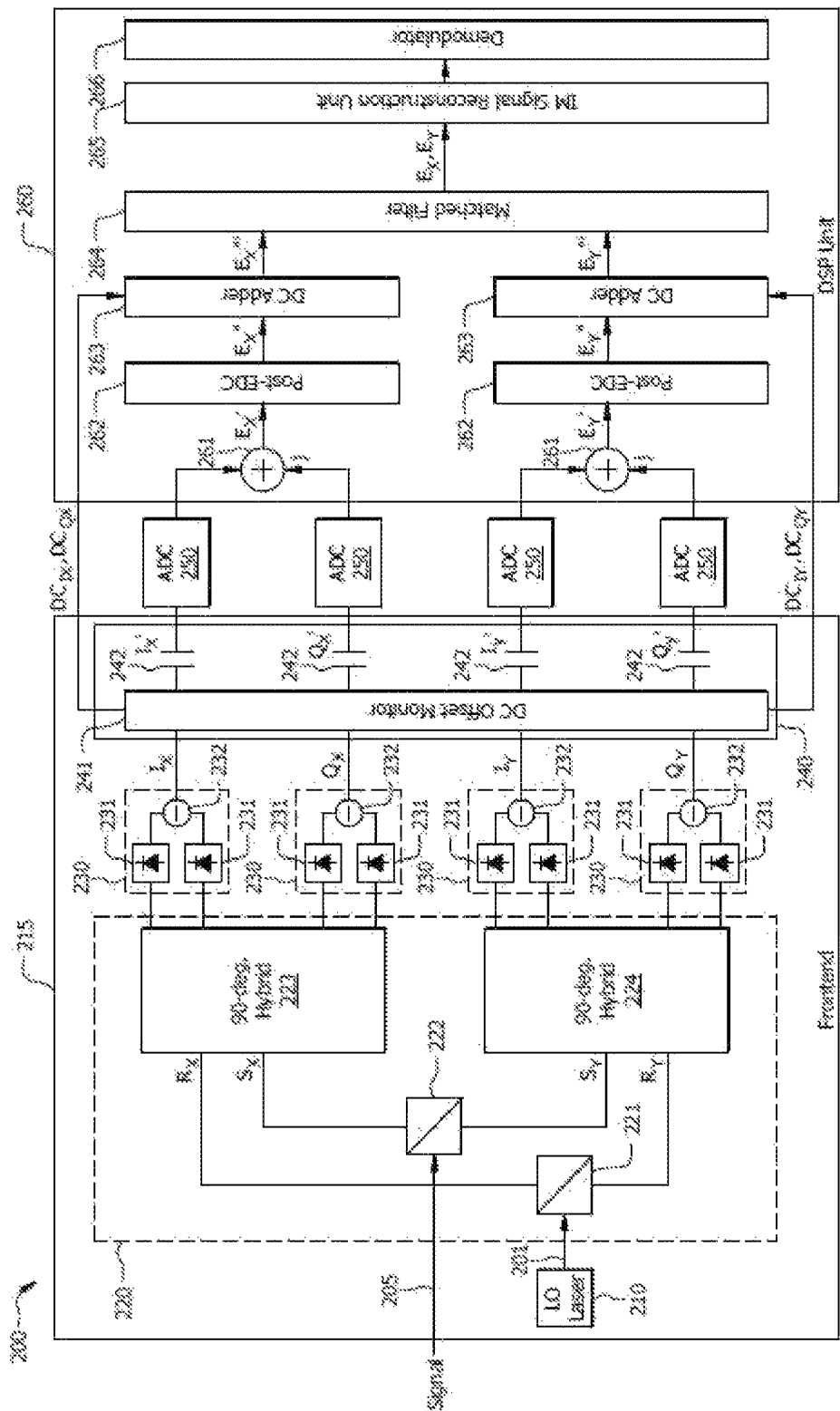
FIG. 2 is a schematic diagram of an embodiment of an optical receiver.

FIG. 2 is a schematic diagram of an embodiment of an optical receiver 200, which may be employed by an OLT, such as the OLT 110, an ONU, such as the ONU 120, a CLT in an EPoC network, or any other optical communication device. The receiver 200 may be suitable for performing post-EDC after a signal propagates through a fiber dispersion-limited link, such as the optical transport links 161, 162, and 163. The optical receiver 200 may comprise a frontend 215, a plurality of ADCs 250, and a DSP unit 260. The frontend 215 may comprise a local oscillator (LO) laser 210, a polarization-diversity optical hybrid 220, a plurality of balance detectors 230, and a DC controller 240. The frontend 215 may be configured to couple to an optical transport link, such as the optical transport link 161, 162, or 163, and receive an optical signal 205 from the optical transport link, where the optical signal 205 may be an IM signal. For example, the optical signal 205 may be transmitted by a conventional optical transmitter, such as the ONU 120's transmitter.

The LO laser 210 may be configured to provide a reference signal 201 with a phase and/or frequency substantially close to the phase and/or the frequency of the transmitter. The polarization-diversity optical hybrid 220 may be coupled to the LO laser 210 and configured to mix the optical signal 205 with the reference signal 201 and convert the optical signal 205 into a baseband signal. For example, the polarization-diversity optical hybrid 220 may comprise a first polarization beam splitter (PBS) 221, a second PBS 222, a first 90 degree (°) hybrid 223, and a second 90° hybrid 224.

The PBSs 221 and 222 may be optical devices configured to split an optical signal into two orthogonal polarization components, for example, an X-polarization component and a Y-polarization component. The PBS 221 may be coupled to the first 90° hybrid 223 and the PBS 222 may be coupled to the second 90° hybrid 224. The first 90° hybrid 223 and the second 90° hybrid 224 may be optical devices, such as 2×2 Mach-Zehnder Interferometers (MZIs), each configured to mix an incoming signal, such as the optical signal 205, with a reference signal, such as the reference signal 201, to produce four signals. The signals may be in the complex-field space, comprising a real signal sum component, a real signal difference component, an imaginary signal sum component, and an imaginary signal difference component.

As shown in FIG. 2, the LO laser 210 may be coupled to the first PBS 221 and the optical signal 205 may be coupled to the second PBS 222. The first PBS 221 may split the reference signal 201 into an X-polarization component, denoted as $R_X$, and a Y-polarization component, denoted as $R_Y$, where $R_X$ may be coupled to the first 90° hybrid 223 and $R_Y$ may be coupled to the second 90° hybrid 224. Similarly, the second PBS 222 may split the optical signal 205 into an X-polarization component, denoted as $S_X$, and a Y-polarization component, denoted as $S_Y$, where $S_X$ may be coupled to the first 90° hybrid 223 and $S_Y$ may be coupled to the second 90° hybrid 224. The polarization-diversity optical hybrid 220 may be coupled to the balance detectors 230.

Each balance detector 230 may comprise a pair of photodetectors 231 coupled to a signal difference element 232. Each photodetector 231 may be a photodiode configured to convert an optical signal into an analog electrical signal. Each signal difference element 232 may provide a signal difference between the analog electrical signals converted by the respective pair of photodetectors 231, for example, cancelling noise fluctuations from the received optical signal 205 and the reference signal 201. As shown in FIG. 2, a first of the balance detectors 230 may generate the I component of an X-polarization signal E-field, denoted as $I_X$, and a second of the balance detectors 230 may generate the Q component of the X-polarization signal E-field, denoted as $Q_X$. Similarly, a third of the balance detectors 230 may generate the I component of a Y-polarization signal E-field, denoted as $I_Y$, and a fourth of the balance detectors 230 may generate the Q component of the Y-polarization signal E-field, denoted as $Q_Y$. The balanced detectors 230 may be coupled to the DC controller 240.

The DC controller 240 may comprise a DC offset monitor 241 and a plurality of DC blocking elements 242. The DC offset monitor 241 may be configured to monitor and measure a DC offset for each of the electrical signal components, $I_X$, $Q_X$, $I_Y$, and $Q_Y$. DC offset may be referred to as the mean value of a signal waveform or the mean voltage offset with respect to zero volts (V). For example, each of the electrical signal components, $I_X$, $Q_X$, $I_Y$, and $Q_Y$, may comprise a DC offset, $DC_{I_X}$, $DC_{Q_X}$, $DC_{I_Y}$, and $DC_{Q_Y}$, respectively. The DC blocking elements 242 may be capacitors that filter out DC signal components from an input signal. For example, the DC blocking elements 242 may remove the DC offsets from the electrical signal components, $I_X$, $Q_X$, $I_Y$, and $Q_Y$ to produce DC-free electrical signal components, denoted as $I_X'$, $Q_X'$, $I_Y'$, and $Q_Y'$, respectively. The DC controller 240 may be coupled to the ADCs 250, which may convert the DC-free analog electrical signal components $I_X'$, $Q_X'$, $I_Y'$, and $Q_Y'$ into digital electrical signals. The ADCs 250 may be coupled to the DSP unit 260. By removing the DC offsets, the DC-free electrical signal components may comprise smaller signal ranges, thus the optical receiver 200 may employ ADCs 250 and DSP unit 260 with lower resolutions.

The DSP unit 260 may comprise a plurality of signal adders 261, a plurality of post-EDC units 262, a plurality of DC adders 263, a matched filter 264, an IM signal reconstruction unit 265, and a demodulator 266. Each signal adder 261 may be configured to add an I component and a Q component in the complex-field space. For example, a first of the signal adders 261 may be configured to add the I component and the Q component in the X-polarization to produce a DC-free X-polarization complex signal, denoted as $E_X'$, and a second of the signal adders 262 may be configured to add the I component and the Q component in the Y-polarization to produce a DC-free Y-polarization complex signal, denoted as $E_Y'$.

The post-EDC units 262 may be coupled to the signal adders 261 and configured to perform post-EDC. For example, a first of the post-EDC units 262 may process $E_X'$ to produce a DC-free compensated X-polarization signal, $E_X''$, and a second of the post-EDC units 262 may process $E_Y'$ to produce a DC-free compensated Y-polarization signal, denoted as $E_Y''$. The two post-EDC units 262 may be configured to compensate CD based on, for example, a CD amount of D ps/nm, associated with the transmitter of the received optical signal 205 and may operate in a frequency domain. For example, each post-EDC unit 262 may comprise a fast Fourier transform (FFT) sub-unit, a frequency filter, and an inverse FFT (IFFT) sub-unit. The FFT sub-unit may convert $E_X'$ or $E_Y'$ into a frequency domain sequence. The frequency filter may be configured to comprise a phase matched to an opposite value of D, for example, by setting a post-compensation value, $D_{post}$, to $-D$. The frequency domain sequence may be filtered by the frequency filter to reverse or remove the CD effect. After filtering, the IFFT sub-unit may convert the compensated frequency sequence into a time domain sequence. The post-EDC units 262 may be coupled to the DC adders 263.

The DC adders 263 may be configured to restore the DC offsets removed in the DC controller 240 by adding the respective DC offsets to the DC-free compensated X-polarization and Y-polarization signals. For example, a first of the DC adders 263 may be configured to add the DC offsets $DC_{I_X}$ and $DC_{Q_X}$ to the I and Q components of the DC-free compensated X-polarization signal, $E_X''$, respectively, to produce a DC-restored compensated X-polarization signal, $E_X'''$, as follows:

$$\text{real}(E_X''') = \text{real}(E_X'') + DC_{I_X}$$

$$\text{imag}(E_X''') = \text{imag}(E_X'') + DC_{Q_X} \quad (3)$$

where real represents the real component and imag represents the imaginary component.

Similarly, a second of the DC adders 263 may be configured to add the DC offsets $DC_{I_Y}$ and $DC_{Q_Y}$ to the I and Q components of the DC-free compensated Y-polarization signal, $E_Y''$, respectively, to produce a DC-restored compensated Y-polarization signal, $E_Y'''$, as follows:

$$\text{real}(E_Y''') = \text{real}(E_Y'') + DC_{I_Y}$$

$$\text{imag}(E_Y''') = \text{imag}(E_Y'') + DC_{Q_Y} \quad (4)$$

The matched filter 264 may be coupled to the DC adders 263. The matched filter 264 may be configured to perform pulse-shaping to match $E_X'''$ and $E_Y'''$ to the transmit pulse-shaping employed at the transmitter of the optical received signal 205. The outputs of the matched filter 264 may be represented as $E_X$ and $E_Y$. It should be noted that the matched filter 264 may be optional depending on the modulation scheme in use, for example, an OFDM modulated signal may be processed without a matched filter, where $E_X'''$ and $E_X'''$ may be the same signal, and $E_Y'''$ and $E_Y'''$ may be the same signal. The matched filter 264 may be coupled to the IM signal reconstruction unit 265.

The IM signal reconstruction unit 265 may be configured to reconstruct the E-field of the optical signal 205 after the post-EDC. For example, the reconstructed power waveform of the IM signal may be computed as shown below:

$$P(t)=|E_X(t)|^2+|E_Y(t)|^2, \quad (5)$$

where $|E_X(t)|^2$ represents the power signal for $E_X$, $|E_Y(t)|^2$ represents the power signal for $E_Y$, and P(t) represents the power waveform of the IM signal and t represents time.

The demodulator 266 may be coupled to the IM signal reconstruction unit 265 and may be configured to demodulate the CD compensated IM signal according to a predetermined modulated format, such as OOK, n-PAM, duobinary, DMT, or OFDM, to recover the original transmitted data.

It should be noted that the optical receiver 200 may be referred to as an alternating current (AC)-coupled digital coherent detection (DCD) receiver since the DC offsets are removed prior to the digital coherent detection at the DSP unit 260.

Figure 3:
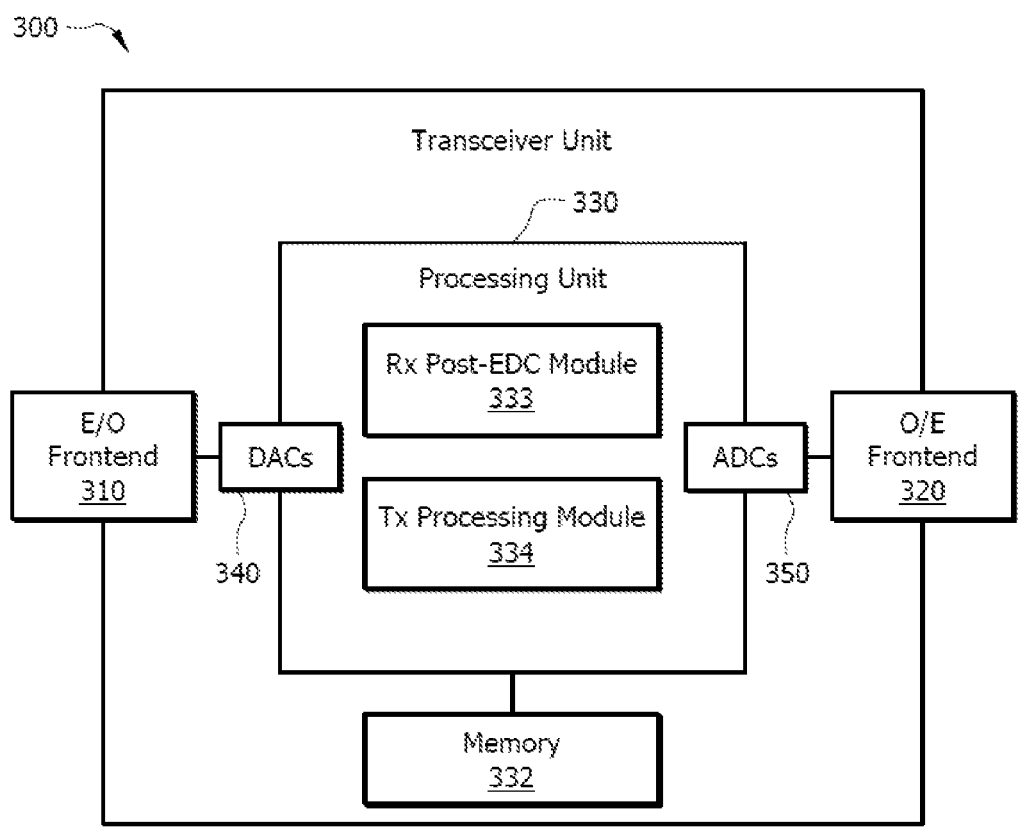
FIG. 3 is a schematic diagram of an embodiment of a transceiver unit.

FIG. 3 is a schematic diagram of an embodiment of a transceiver unit 300, which may be any device that transmits and/or receives optical signals carrying encoded data. For example, the transceiver unit 300 may be located in an optical communication device, such as the OLT 110, the ONU 120, a CLT in an EPoC network, or any other optical network element suitable for use in an optical network, such as the PON 100, or any other optical transport network (OTN), and/or may comprise the optical receiver 200. The transceiver unit 300 may also be configured to implement or support any of the schemes described herein, such as method 400, 500, 600, and/or 700, as discussed more fully below. One skilled in the art will recognize that the term "transceiver unit" encompasses a broad range of devices of which transceiver unit 300 is merely an example. Transceiver unit 300 is included for purposes of clarity of discussion, but is in no way meant to limit the application of the present disclosure to a particular transceiver unit embodiment or class of transceiver unit embodiments. At least some of the features and methods described in the disclosure may be implemented in a network apparatus or component such as a transceiver unit 300. For instance, the features and methods in the disclosure may be implemented using hardware, firmware, and/or software installed to run on hardware. As shown in FIG. 3, the transceiver unit 300 may comprise an electrical-to-optical (E/O) frontend 310 and/or an optical-to-electrical (O/E) frontend 320, which may convert an electrical signal to an optical signal for transmission in an OTN and/or receive an optical signal from the OTN and convert the optical signal to an electrical signal, respectively. A processing unit 330 may be coupled to the E/O frontend 310 and the O/E frontend 320 via a plurality of DACs 340, similar to DACs 220, and ADCs 350, respectively, which may or may not be part of the processing unit 330. The DACs 340 may convert digital electrical signals generated by the processing unit 330 into analog electrical signals that may be fed into the E/O frontend 310. The ADCs 350 may convert analog electrical signals received from the O/E frontend 320 into digital electrical signals that may be processed by the processing unit 330. The processing unit 330 may comprise one or more processors, which may include general processors, single-core processors, multi-core processors, application specific integrated circuit (ASICs), and/or DSPs. The processing unit 330 may comprise a receive (Rx) post-EDC module 333, which may implement the method 400, 500, and/or 600, and a transmit (Tx) processing module 334, which may implement the method 700. In an alternative embodiment, the Rx post-EDC module 333 and the Tx processing module 334 may be implemented as instructions stored in the memory module 332, which may be executed by the processing unit 330. The memory module 332 may comprise a cache for temporarily storing content, e.g., a random-access memory (RAM). Additionally, the memory module 332 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof.

It is understood that by programming and/or loading executable instructions onto the transceiver unit 300, at least one of the processing unit 330 and/or memory module 332 are changed, transforming the transceiver unit 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design, numbers of units to be produced, and/or clock speed requirements rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose central processing unit (CPU) inside a computer system) in a computer system to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Figure 4:
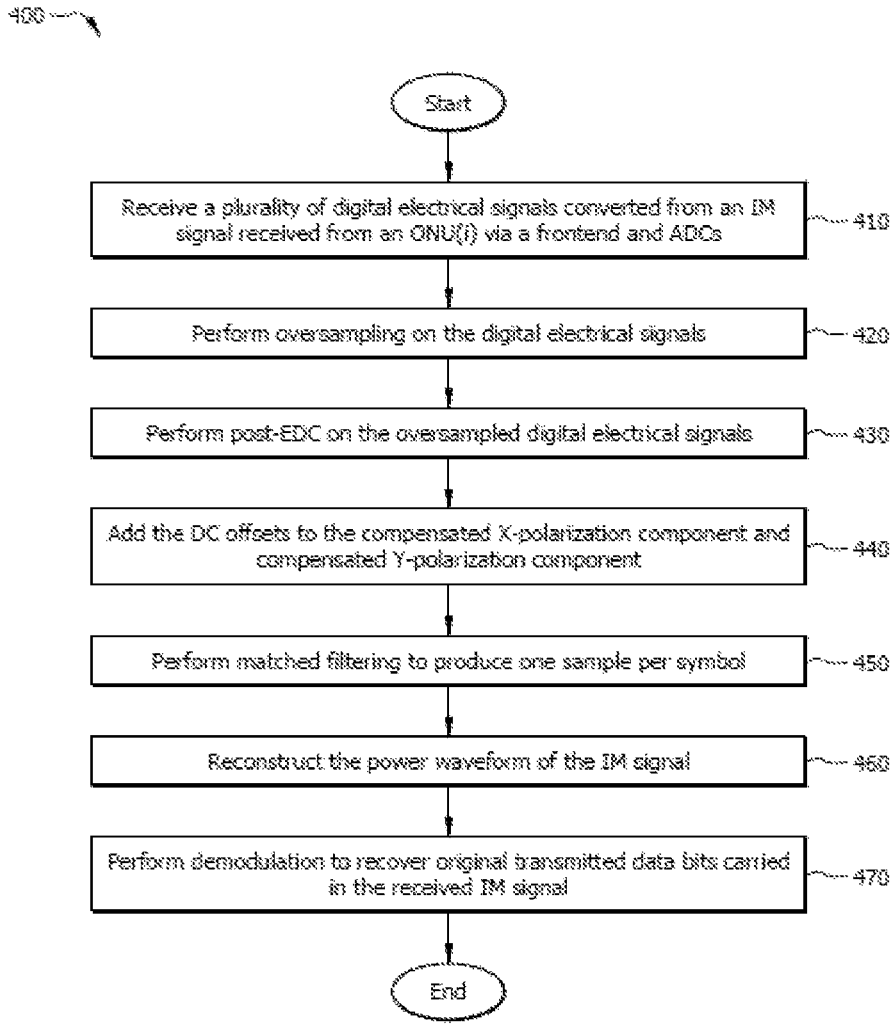
FIG. 4 is a flowchart of an embodiment of a method for performing electronic dispersion post-compensation (post-EDC).

FIG. 4 is a flowchart of an embodiment of a method 400 for performing post-EDC, which may be implemented at an optical receiver, such as the optical receiver 200 or the transceiver unit 300, and may be employed by an OLT, such as the OLT 110, or an ONU, such as the ONU 120. The method 400 may be suitable for implementing in a DSP unit, such as the DSP unit 260 or the processing unit 330. The method 400 may be described in the context of the OLT, but similar mechanisms may be applied to the ONU. The OLT may be connected to a plurality of ONUs, each associated with an ONU-specific fiber dispersion effect depending on the optical path between the OLT and the ONU. The method 400 may perform the post-EDC on each US signal at a first digital processing stage, for example, prior to demodulation. The method 400 may begin with a set of known or predetermined ONU-specific dispersion values, D(i), each associated with a specific ONU, ONU(i), where i may be a positive integer number that varies from 1 to N.

At step 410, a plurality of digital electrical signals may be received, for example, from a plurality of ADCs, such as the ADCs 250. The digital electrical signals may be converted from a received IM signal, such as the optical signal 205, via a frontend, such as the frontend 215. The digital electrical signals may comprise an I component and a Q component of an X-polarization component, and an I component and a Q component of a Y-polarization component corresponding to an ONU, ONU(i). The digital electrical signals may be DC-free signals, where the DC offset may be measured and removed by a DC controller, such as the DC controller 240.

At step 420, oversampling may be performed on the digital electrical signals to increase resolution, for example, via a 2× oversampling. At step 430, after oversampling, post-EDC may be performed on the oversampled digital electrical signals. The X-polarization component and the Y-polarization component may be separately compensated according to a corresponding D(i) associated with the ONU (i) to produce a compensated X-polarization component, $E_x''$, and a compensated Y-polarization component, $E_y''$. Since CD may be dependent on fiber lengths and may be substantially static (e.g., quasi-static), a frequency domain approach may be suitable for the post-EDC.

For example, a plurality of frequency domain filters may be determined such that each frequency domain filter may produce a dispersion effect based on a given compensation dispersion value, $D_{post}(i)$, that is opposite to a corresponding ONU-specific dispersion value, D(i) (e.g., $D_{post}(i)=-D(i)$). Each polarization component may be transformed into a frequency sequence via an FFT, a frequency domain filter may be selected according to $D_{post}(i)$, and the frequency sequence may be compensated by filtering the frequency sequence with the selected frequency domain filter. The compensated frequency sequence may be converted to a time domain digital signal sequence via an IFFT. In some embodiments, other frequency-response equalization and other non-linearity compensation may be performed. The frequency domain compensation or equalization may be performed by employing an overlap-and-add approach or an overlap-and-save approach. It should be noted that the frequency domain filters may be static filters, but may be updated during a network reconfiguration (e.g., changes in physical configuration, such as fiber length change).

At step 440, the DC offsets may be added to the compensated X-polarization component, $E_x''$, and the compensated Y-polarization component, $E_y''$. For example, the DC offsets may be read or received from the DC controller and the DC offsets may be added accordingly as described above in equations (3) and (4).

At step 450, matched filtering may be performed to produce one sample per symbol, for example, matched to the transmitter's sample timing and pulse-shaping. At step 460, a CD compensated IM signal may be reconstructed, where the power waveform of the compensated IM signal may be computed according to equation (5) as described above. At step 470, demodulation may be performed on the CD compensated IM signal to recover the original transmitted data bits. It should be noted that steps 420 and 450 may be optional.

Figure 5:
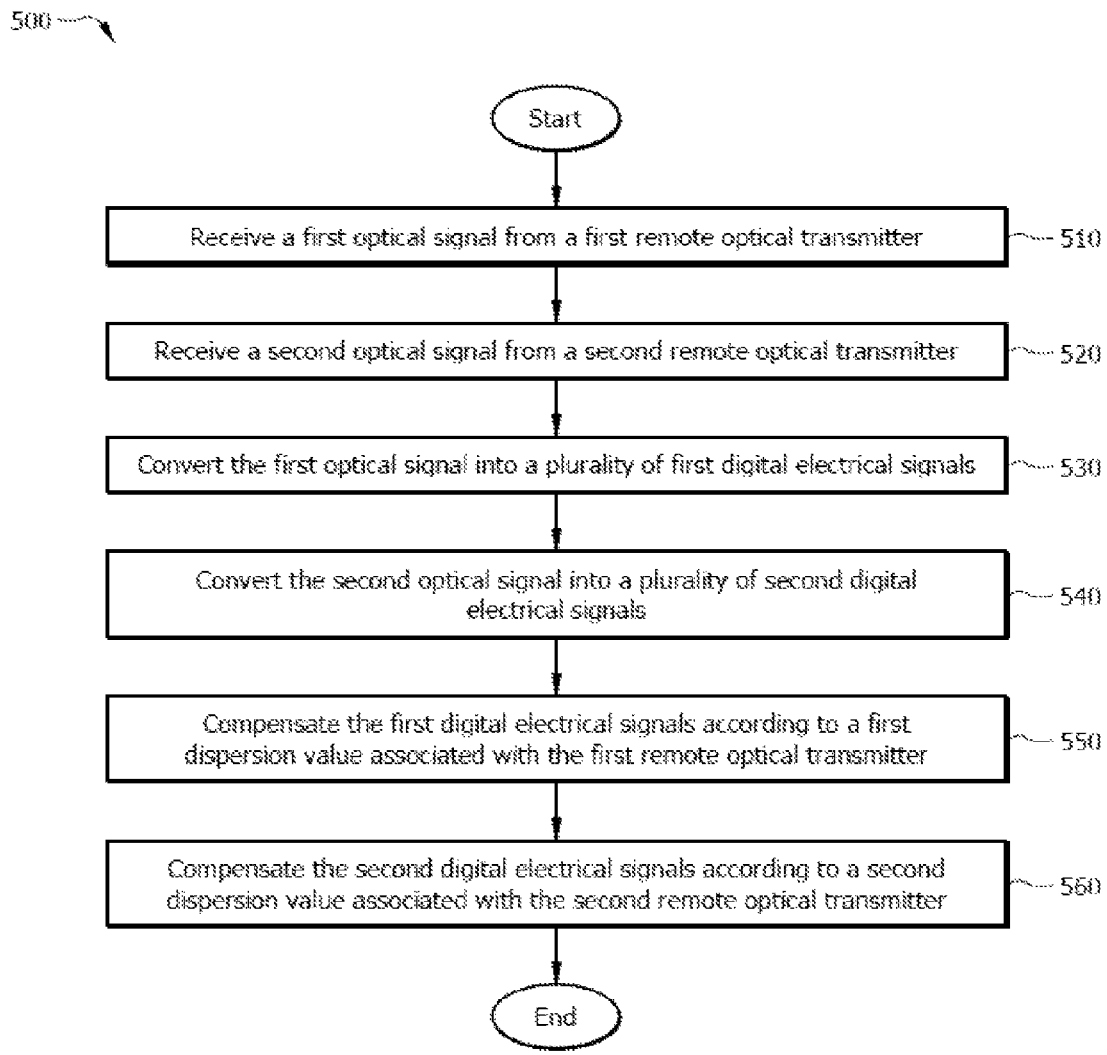
FIG. 5 is a flowchart of another embodiment of a method for performing post-EDC.

FIG. 5 is a flowchart of another embodiment of a method 500 for performing post-EDC. The method 500 may be similar to the method 400 and may be implemented at an optical receiver, such as the optical receiver 200 or the transceiver unit 300, and may be employed by an OLT, such as the OLT 110, or an ONU, such as the ONU 120. At step 510, a first optical signal may be received from a first remote optical transmitter, such as the ONU 120's transmitter. At step 520, a second optical signal may be received from a second remote optical transmitter. The first and second optical signals may carry data symbols that are modulated via OOK, PAM, BPSK, QPSK, 16-QAM, or higher order modulation formats.

At step 530, the first optical signal may be converted into a plurality of first digital electrical signals, for example, via a frontend, such as the frontend 215, and a plurality of ADCs, such as the ADCs 250. At step 540, the second optical signal may be converted into a plurality of second digital electrical signals.

At step 550, the first digital electrical signals may be compensated according to a first dispersion value associated with the first remote optical transmitter, for example, by employing similar mechanisms as described in the step 430. At step 560, the second digital electrical signals may be compensated according to a second dispersion value associated with the second remote optical transmitter. For example, the first dispersion value may be opposite to an amount of CD in an optical fiber link, such as the optical transport link 161, 162, or 163, between the first remote optical transmitter and the optical receiver. Similarly, the second dispersion value may be opposite to an amount of CD in an optical fiber link between the second remote optical transmitter and the optical receiver.

Figure 6:
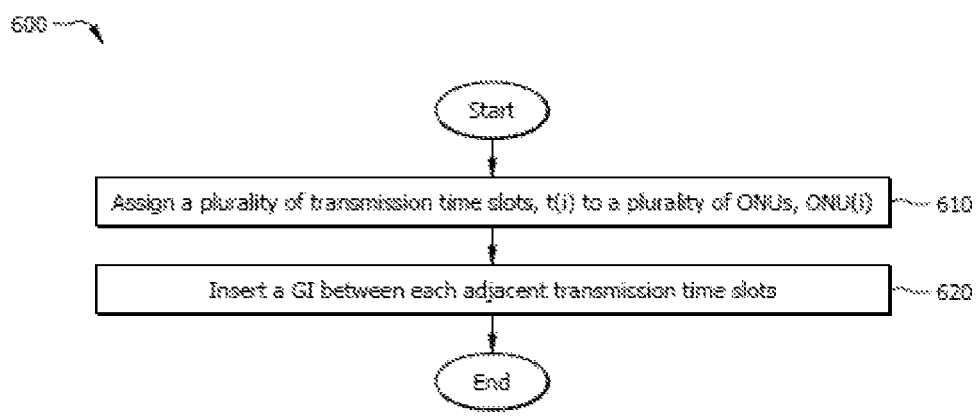
FIG. 6 is a flowchart of an embodiment of a method for generating an upstream (US) transmission schedule.

FIG. 6 is a flowchart of an embodiment of a method 600 for generating a US transmission schedule, which may be implemented at an OLT, such as the OLT 110, or other optical network controller. The method 600 may be employed for allocating US transmission time slots and considering ONU-specific fiber dispersions in the transmission schedule to further reduce or mitigate fiber dispersion. At step 610, a plurality of transmission time slots, t(i), may be assigned to a plurality of ONUs, ONU(i), where i is a positive integer number varying from 1 to N. Each ONU(i) may be associated with a particular fiber dispersion value, D(i). When the ONUs employ different transmit wavelengths, the US transmission time slots may be arranged according to the ONUs' transmit wavelengths to simplify tracking at the OLT's receiver when performing post-EDC. At step 620, a GI may be inserted between each adjacent transmission time slots, where the GI duration may be based on the CD associated with the ONUs that are assigned to the transmission time slots. For example, the duration of a GI between two time slots, t(i) and t(i+1) may be configured to be greater than about 50% of the sum of the D(i) and D(i+1) as described in equation (1). Alternatively, the GI may be configured to be greater than the mean value of all D(i) as described in equation (2).

Figure 7:
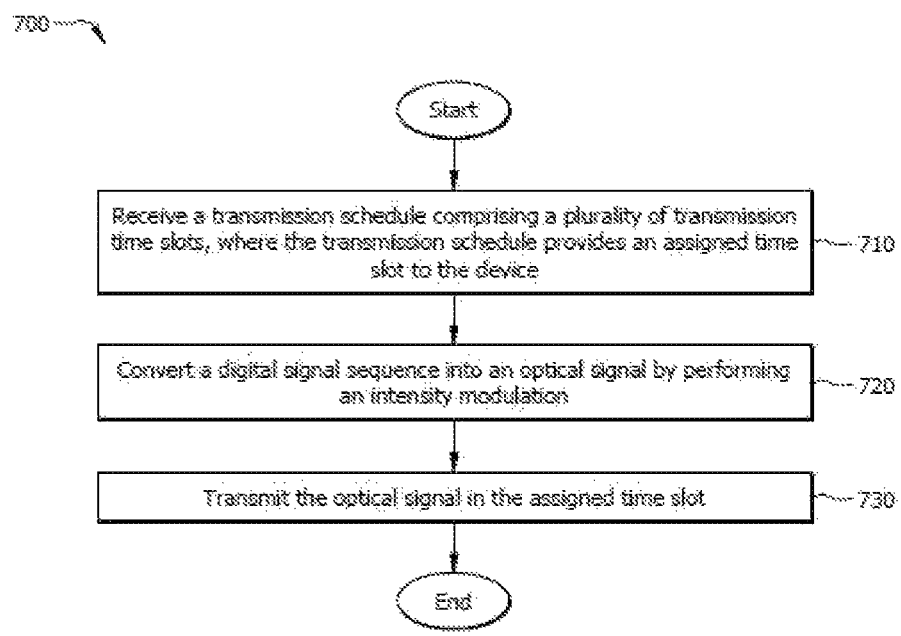
FIG. 7 is a flowchart of an embodiment of a method for transmitting a US signal according to a fiber dispersion-based US transmission schedule.

FIG. 7 is a flowchart of an embodiment of a method 700 for transmitting a US signal according to a fiber dispersion-based US transmission schedule. The method 700 may be implemented at the transmitter of an optical device, such as the ONU 120. At step 710, a transmission schedule comprising a plurality of transmission time slots may be received. The transmission schedule may assign a transmission time slot to the device and may comprise a GI that is based on a CD associated with the device. At step 720, a digital signal sequence may be converted into an optical signal by performing an intensity modulation. At step 730, the optical signal may be transmitted in the assigned time slot.

FIGS. 8A-12B illustrate exemplary constellation plots and eye diagrams for a 40 Gbps 4-PAM signal at several transmission and reception stages. The 4-PAM signal may be generated by a conventional optical transmitter, such as an ONU 120's transmitter, that employs intensity modulation. The 4-PAM signal may be transmitted over an optical fiber link, such as the optical transport link 161, 162, or 163, comprising a standard single-mode fiber (SSMF) with a dispersion coefficient of about 17 picoseconds per nanometer wavelength change and kilometer propagation distance (ps/nm/km) and a length of about 40 km. Thus, the total amount of CD in optical fiber link may be about 680 ps/nm. After transmission over the optical fiber link, the 4-PAM signal may be received and processed by an AC-coupled DCD receiver, such as the optical receiver 200 or the OLT 110's receiver.

Figure 8A:
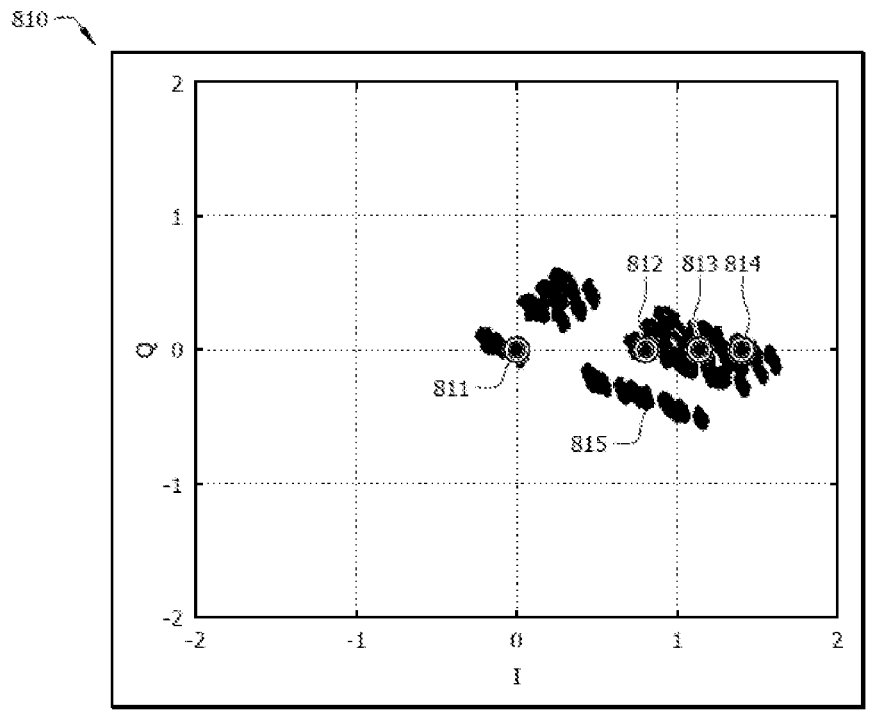
FIG. 8A is a constellation plot for a 4 level pulse-amplitude modulation (4-PAM) signal.

FIG. 8A is a constellation plot 810 for the 4-PAM signal. In the constellation plot 810, the x-axis represents I components of an E-field and the y-axis represents Q components of the E-field, where the x-axis and the y-axis may be in some constant units. The points 811, 812, 813, and 814 (shown as circles) may represent the E-field of the 4-PAM signal generated at the transmitter and may correspond to the 4 signal levels provided by the 4-PAM modulation. For example, in gray-coding, the points 811, 812, 813, and 814 may represent binary values 00, 01, 11, and 10, respectively. The points 815 (shown as solid dots) may represent the E-field of the 4-PAM signal after transmission over the dispersion-limited optical fiber link, for example, captured at the receiver. As can be seen, the E-field of the transmitted 4-PAM signal is distorted by the CD of the dispersion-limited optical fiber link, where the points 811-814 may be rotated and/or scaled due to the CD effect.

Figure 8B:
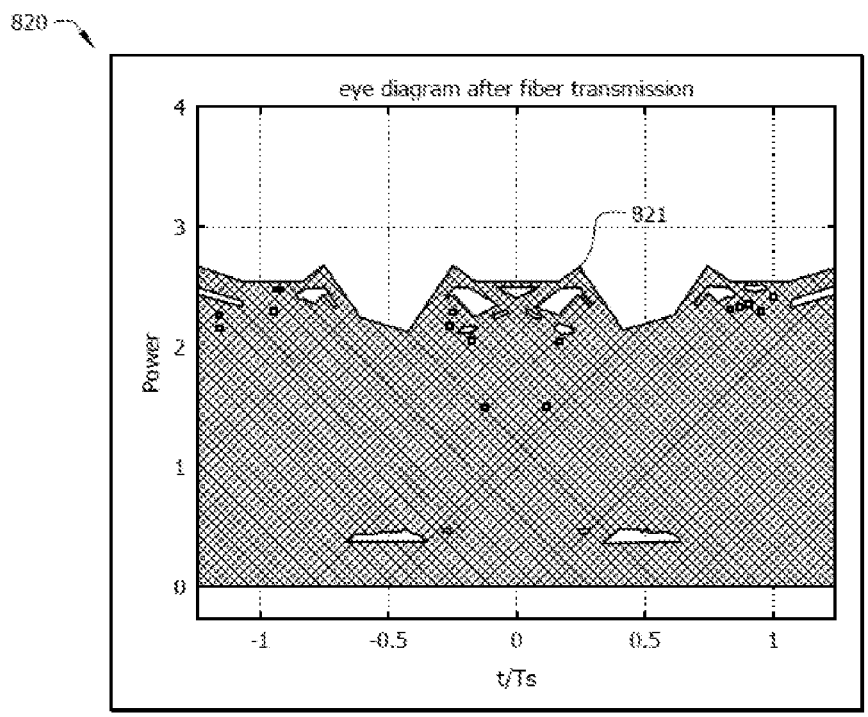
FIG. 8B is a signal eye diagram for a 4-PAM signal.

FIG. 8B is a signal eye diagram 820 for the 4-PAM signal. In the eye diagram 820, the x-axis represents time in units of time per symbol period (t/Ts) and the y-axis represents normalized received power in some constant units. The eye pattern 821 may be captured at the receiver after the 4-PAM signal propagates through the dispersion-limited optical fiber link. For example, the eye pattern 821 may be captured via an oscilloscope with overlaying or superimposing sweeps of many different segments of a digital data signal received at the receiver. Differences in timing and amplitude from bit to bit cause the eye pattern 821 to open or shrink. As observed in the eye diagram 820, the eye pattern 821 is about completely closed due to CD, where the 4 signal levels of the 4-PAM signal may not be distinguishable. As such, the receiver may not be able to recover the original data carried in the 4-PAM signal without CD equalization.

Figure 9A:
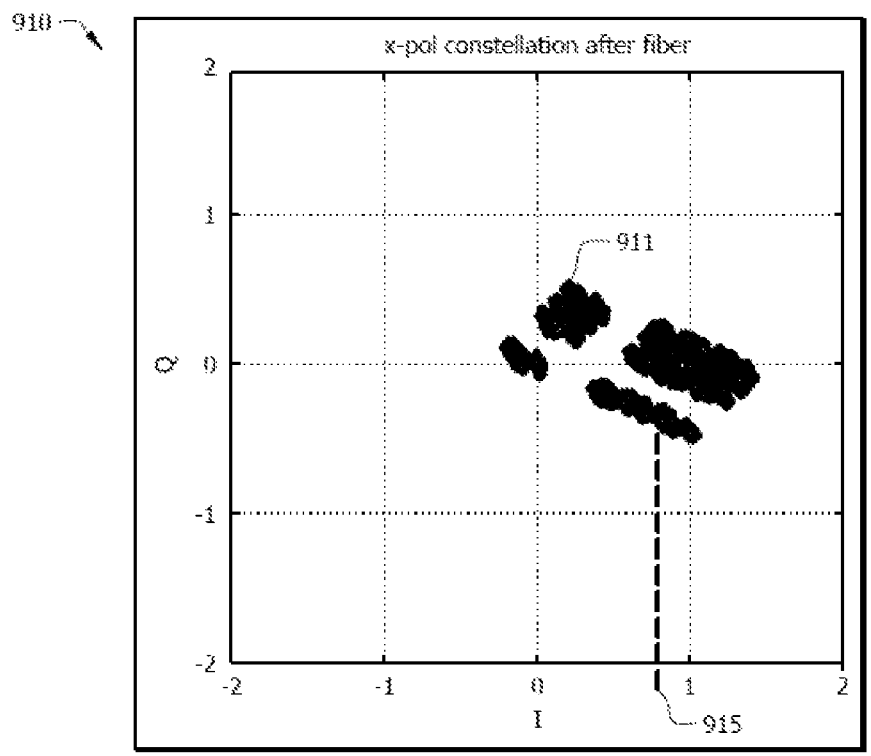
FIG. 9A is a constellation plot for an X-polarization component of a 4-PAM signal after transmission over an optical fiber link with 680 picoseconds per nanometer (ps/nm) dispersion.

FIG. 9A is a constellation plot 910 for an X-polarization component of the 4-PAM signal after transmission over the optical fiber link. In the constellation plot 910, the x-axis and the y-axis may provide similar representations as in the constellation plot 810. The points 911 may represent the E-field of the X-polarization component of the 4-PAM signal captured at the receiver, for example, at the output of the receiver's balance detectors, such as the balance detectors 230. For example, the points 911 may correspond to the X-polarization component of the points 815. As can be seen, the points 911 may comprise a DC offset of about 0.7 (shown as 915).

Figure 9B:
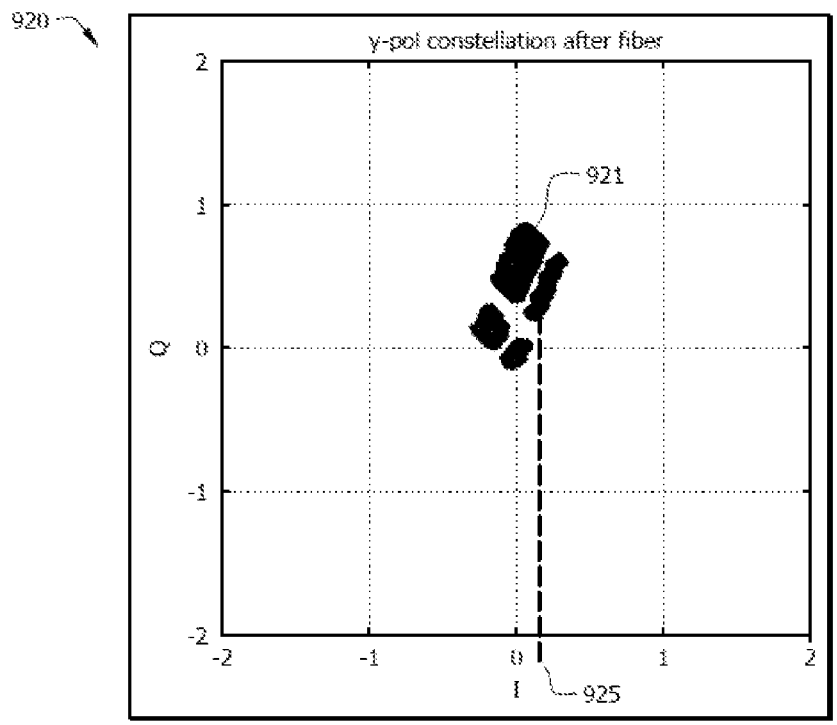
FIG. 9B is a constellation plot for a Y-polarization component of a 4-PAM signal after transmission over an optical fiber link with 680 ps/nm dispersion.

FIG. 9B is a constellation plot 920 for a Y-polarization component of the 4-PAM signal after transmission over the optical fiber link. In the constellation plot 920, the x-axis and the y-axis may provide similar representations as in the constellation plot 810. The points 921 may represent the E-field of the Y-polarization component of the 4-PAM signal captured at the output of the receiver's balance detectors. For example, the points 921 may correspond to the Y-polarization component of the points 815. As can be seen, the points 921 may comprise a DC offset of about 0.2 (shown as 925).

Figure 9C:
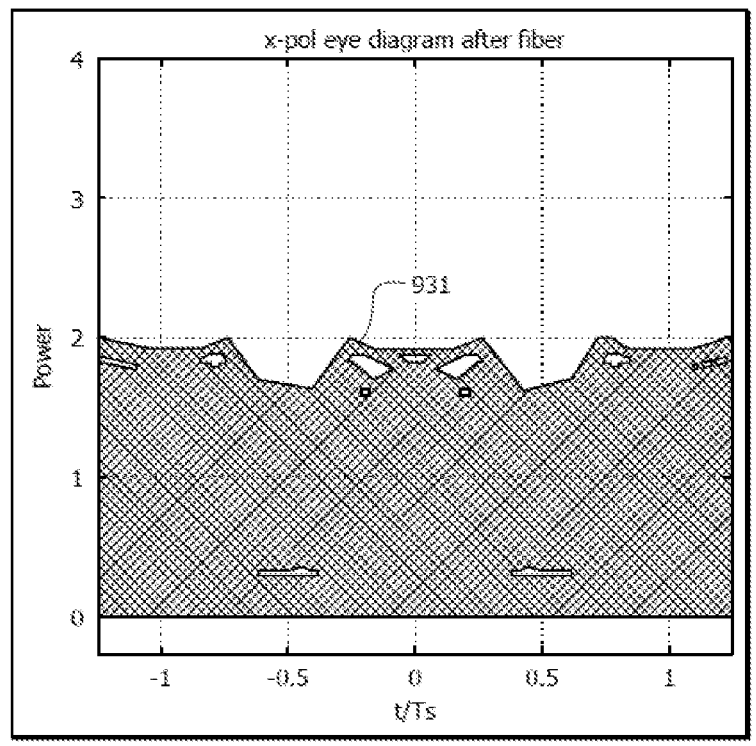
FIG. 9C is a signal eye diagram for an X-polarization component of a 4-PAM signal after transmission over an optical fiber link with 680 ps/nm dispersion.

FIG. 9C is a signal eye diagram 930 for an X-polarization component of the 4-PAM signal after transmission over the optical fiber link. In the eye diagram 930, the x-axis and the y-axis may provide similar representations as in the eye diagram 820. The eye pattern 931 may represent the digital signal for the X-polarization component of the 4-PAM signal captured at the output of the receiver's balance detectors. For example, the eye patterns 931 may correspond to the X-polarization component of the eye pattern 821. As observed, the eye pattern 931 is about completely closed due to CD, where the 4 signal levels of the 4-PAM signal may not be distinguishable.

Figure 9D:
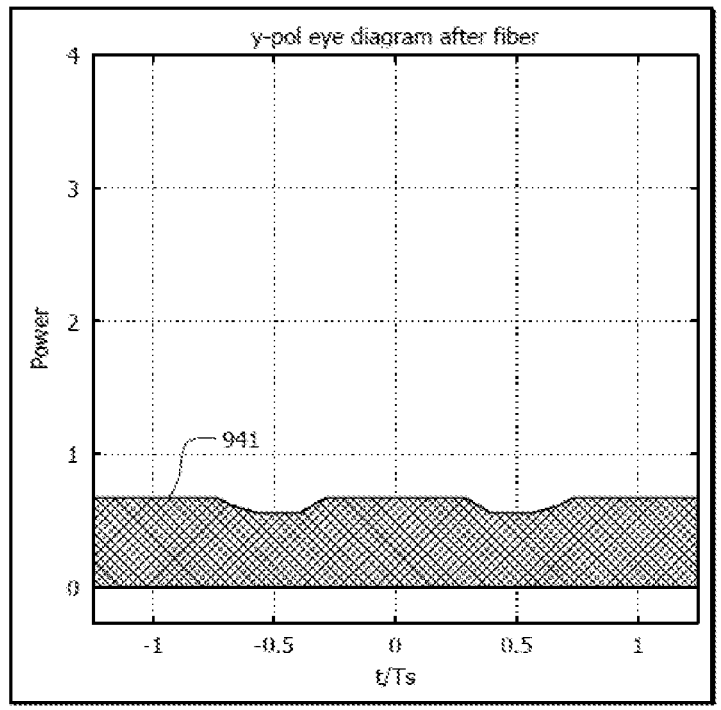
FIG. 9D is a signal eye diagram for a Y-polarization component of a 4-PAM signal after transmission over an optical fiber link with 680 ps/nm dispersion.

FIG. 9D is a signal eye diagram 940 for a Y-polarization component of the 4-PAM signal after transmission over the optical fiber link. In the eye diagram 940, the x-axis and the y-axis may provide similar representations as in the eye diagram 820. The eye pattern 941 may represent the digital signal for the Y-polarization component of the 4-PAM signal captured at the output of the receiver's balance detectors. For example, the eye pattern 941 may correspond to the Y-polarization component of the eye pattern 821. As observed, the eye pattern 941 is about completely closed due to CD, where the 4 signal levels of the 4-PAM signal may not be distinguishable.

Figure 10A:
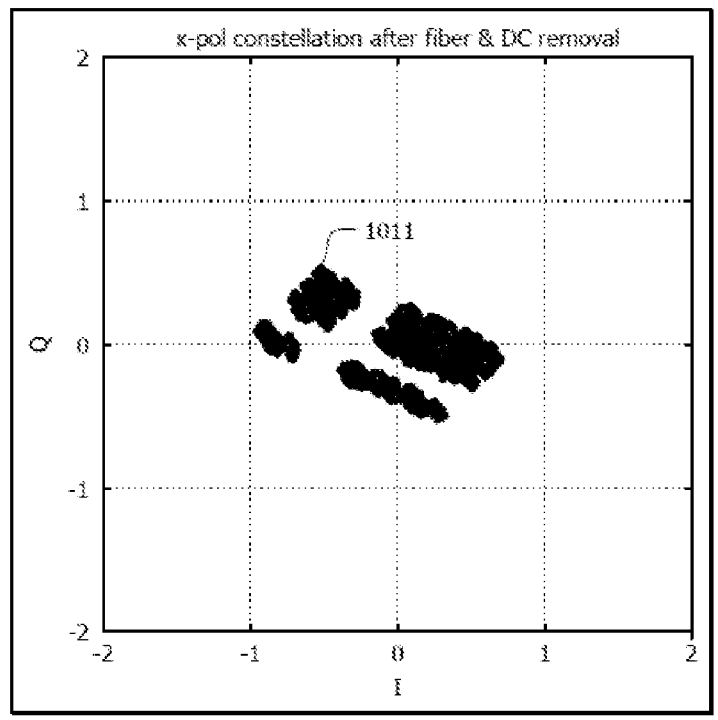
FIG. 10A is a constellation plot for an X-polarization component of a CD-distorted 4-PAM signal after DC removal.

FIG. 10A is a constellation plot 1010 for an X-polarization component of a CD-distorted 4-PAM signal after DC removal, which may be performed by employing similar mechanisms as in the DC controller 240 described above. In the constellation plot 1010, the x-axis and the y-axis may provide similar representations as in the constellation plot 810. The points 1011 may represent the E-field of the X-polarization component of the CD-distorted signal captured at the output of the receiver's DC controller, such as the DC controller 240. For example, the points 1011 may correspond to the points 911 after removing the DC offset of the X-polarization component. By comparing the constellation plots 1010 and 910, the points 1011 and 1021 may span smaller signal ranges than the points 911. Thus, by removing the DC offsets, the receiver may employ ADCs, such as the ADCs 250, and DSP, such as the DSP unit 260, with lower resolutions than without the DC removal.

Figure 10B:
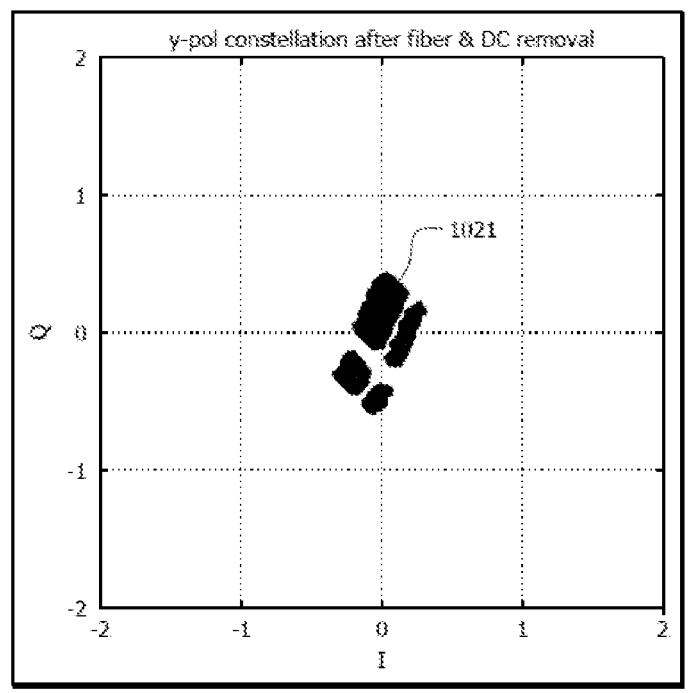
FIG. 10B is a constellation plot for a Y-polarization component of a CD-distorted 4-PAM signal after DC removal.

FIG. 10B is a constellation plot 1020 for a Y-polarization component of a CD-distorted 4-PAM signal after DC removal, which may be performed by employing similar mechanisms as in the DC controller 240 described above. In the constellation plot 1020, the x-axis and the y-axis may provide similar representations as in the constellation plot 810. The points 1021 may represent the E-field of the Y-polarization component of the CD-distorted signal captured at the output of the receiver's DC controller. For example, the points 1021 may correspond to the points 921 after removing the DC offset of the Y-polarization component. By comparing the constellation plots 1020 and 920, the points 1021 may span smaller signal ranges than the points 921.

Figure 10C:
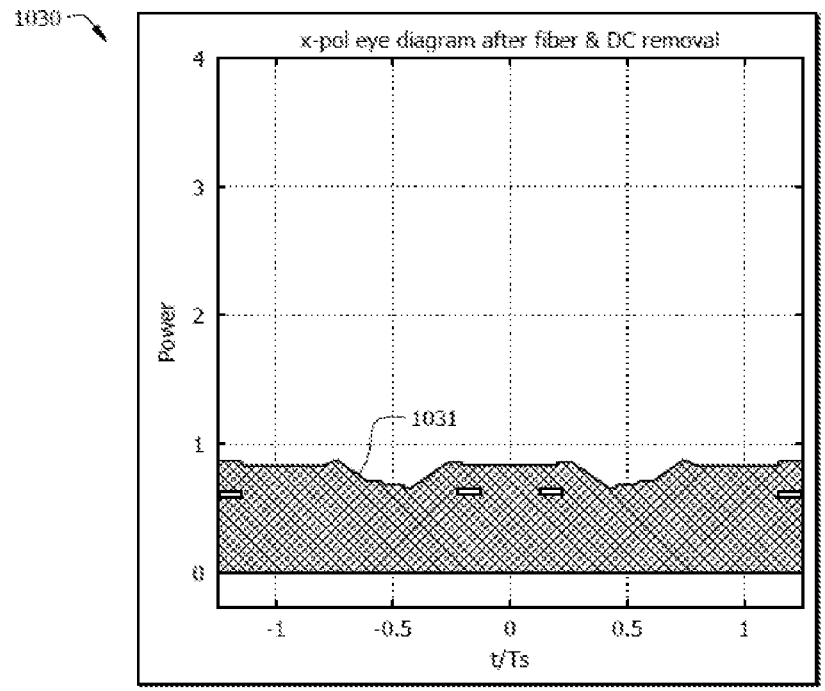
FIG. 10C is a signal eye diagram for an X-polarization of a CD-distorted 4-PAM signal after DC removal.

FIG. 10C is a signal eye diagram 1030 for an X-polarization of a CD-distorted 4-PAM signal after DC removal, which may be performed by employing similar mechanisms as in the DC controller 240 described above. In the eye diagram 1030, the x-axis and the y-axis may provide similar representations as in the eye diagram 820. The eye pattern 1031 may represent the digital signal for the X-polarization component of the CD-distorted signal captured at the output of the receiver's DC controller. For example, the eye pattern 1031 may correspond to the eye patterns 931 after removing the DC offsets. By comparing the eye diagrams 1030 and 930, the eye pattern 1031 may comprise smaller signal ranges than the eye pattern 931.

Figure 10D:
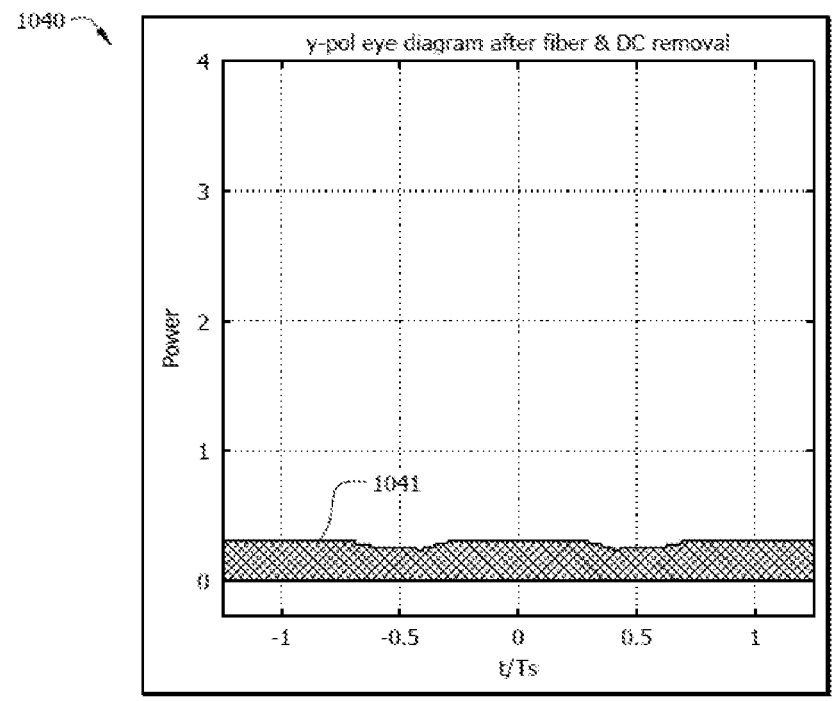
FIG. 10D is a signal eye diagram for a Y-polarization of a CD-distorted 4-PAM signal after DC removal.

FIG. 10D is a signal eye diagram 1040 for a Y-polarization of a CD-distorted 4-PAM signal after DC removal, which may be performed by employing similar mechanisms as in the DC controller 240 described above. In the eye diagram 1040, the x-axis and the y-axis may provide similar representations as in the eye diagram 820. The eye pattern 1041 may represent the digital signal for the Y-polarization component of the CD-distorted signal captured at the output of the receiver's DC controller. For example, the eye pattern 1041 may correspond to the eye pattern 941 after removing the DC offsets. By comparing the eye diagrams 1040 and 940, the eye pattern 1041 may comprise smaller signal ranges than the eye patterns 941.

Figure 11A:
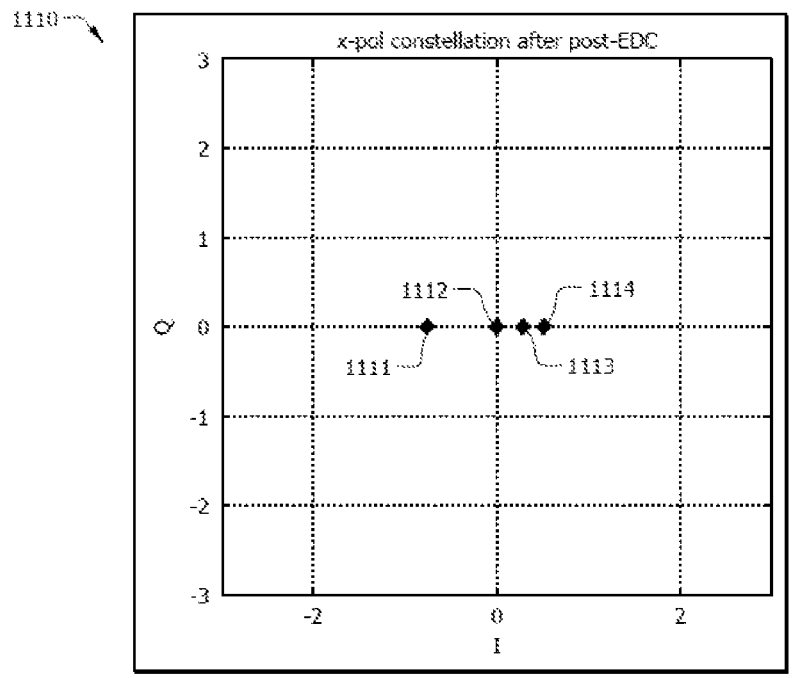
FIG. 11A is a constellation plot for an X-polarization component of a CD compensated 4-PAM signal.

FIG. 11A is a constellation plot 1110 for an X-polarization component of a CD compensated 4-PAM signal, where the CD may be compensated by employing similar mechanisms as described in the method 400. In the constellation plot 1110, the x-axis and the y-axis may provide similar representations as in the constellation plot 810. The points 1111, 1112, 1113, and 1114 may represent the E-field of the X-polarization component of the CD-distorted signal captured at the receiver's post-EDC unit, such as the post-EDC unit 262. In order to remove the CD effect, the post-EDC unit may set the post-compensation value, $D_{post}$, to a value opposite in sign to the dispersion value of the optical fiber link (e.g., $D_{post}$=−680 ps/nm). For example, the points 1111-1114 may correspond to the points 1011 after removing the CD effect. As can be seen, the points 1111-1114 in the constellation plot 1110 are separated by substantial distances. By comparing the constellation plots 1110 and 1010, the post-EDC effectively removes the CD effect.

Figure 11B:
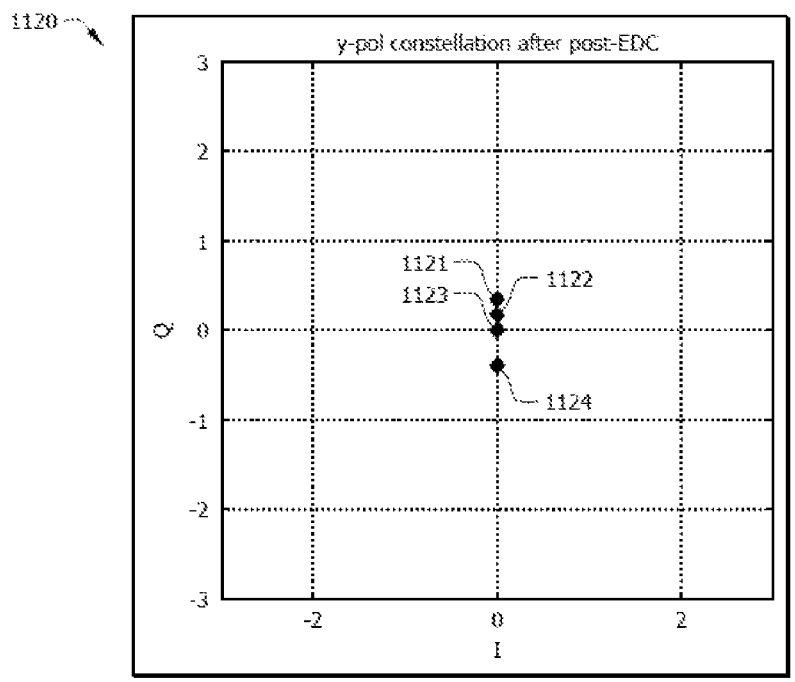
FIG. 11B is a constellation plot for a Y-polarization component of a CD compensated 4-PAM signal.

FIG. 11B is a constellation plot 1120 for a Y-polarization component of a CD compensated 4-PAM signal, where the CD may be compensated by employing similar mechanisms as described in the method 400. In the constellation plot 1120, the x-axis and the y-axis may provide similar representations as in the constellation plot 810. The points 1121, 1122, 1123, and 1124 may represent the E-field of the Y-polarization component of the CD-distorted signal captured at the output of the receiver's post-EDC unit. For example, the points 1121-1124 may correspond to the points 1021 after removing the CD effect. As can be seen, the points 1121-1124 in the constellation plot 1120 are separated by substantial distances. By comparing the constellation plots 1120 and 1020, the post-EDC effectively removes the CD effect.

Figure 11C:
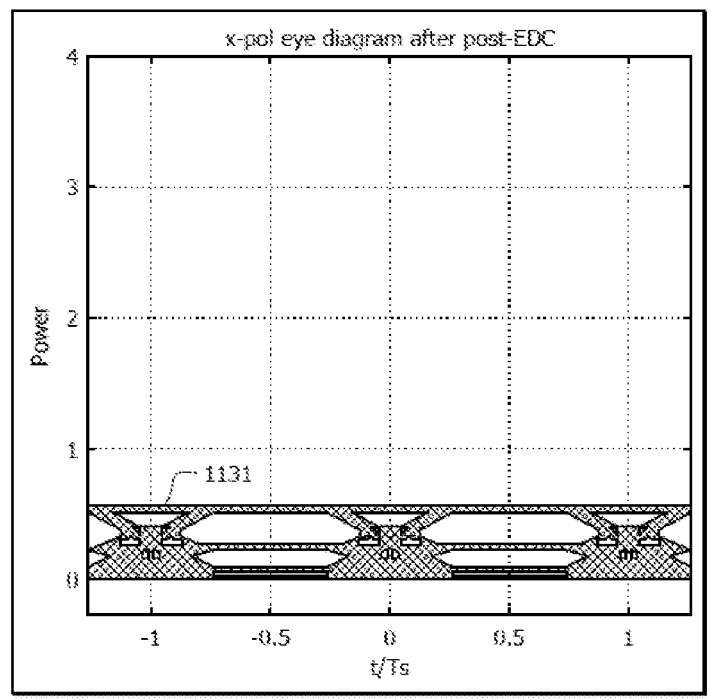
FIG. 11C is a signal eye diagram for an X-polarization component of a CD compensated 4-PAM signal.

FIG. 11C is a signal eye diagram 1130 for an X-polarization component of a CD compensated 4-PAM signal, where the CD may be compensated by employing similar mechanisms as described in the method 400. In the eye diagram 1130, the x-axis and the y-axis may provide similar representations as in the eye diagram 820. The eye pattern 1131 may represent the digital signal for the X-polarization component of the CD-distorted signal captured at the output of the receiver's post-EDC unit. For example, the eye pattern 1131 may correspond to the eye pattern 1031 after removing the CD effect. By comparing the eye diagrams 1130 and 1030, the eye pattern 1131 is opened compared to the eye patterns 1031. Thus, the post-EDC effectively removes the CD effect.

Figure 11D:
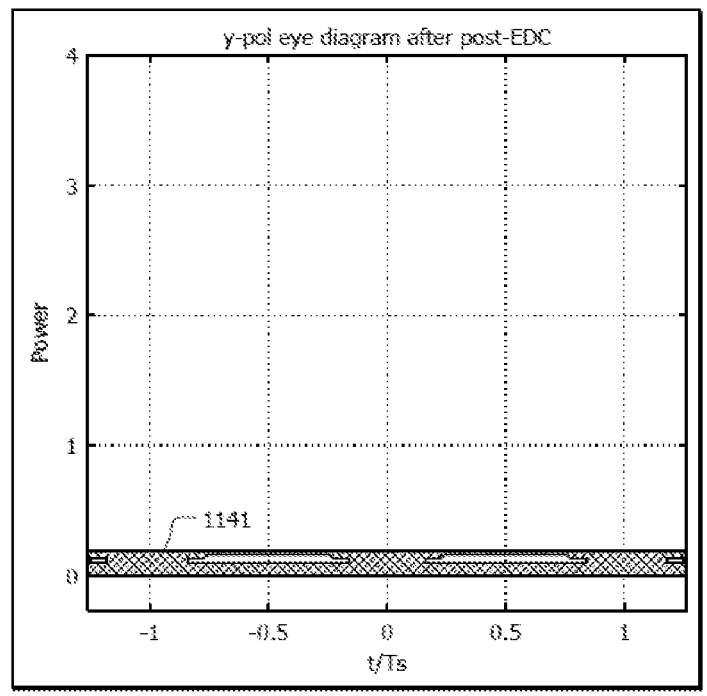
FIG. 11D is a signal eye diagram for a Y-polarization component of a CD compensated 4-PAM signal.

FIG. 11D is a signal eye diagram 1140 for a Y-polarization component of a CD compensated 4-PAM signal, where the CD may be compensated by employing similar mechanisms as described in the method 400. In the eye diagram 1140, the x-axis and the y-axis may provide similar representations as in the eye diagram 820. The eye pattern 1141 may represent the digital signal for the Y-polarization component of the CD-distorted signal captured at the output of the receiver's post-EDC unit. For example, the eye pattern 1141 may correspond to the eye pattern 1041 after removing the CD effect. By comparing the eye diagrams 1140 and 1040, the eye pattern 1141 is opened compared to the eye pattern 1041. Thus, the post-EDC effectively removes the CD effect.

Figure 12A:
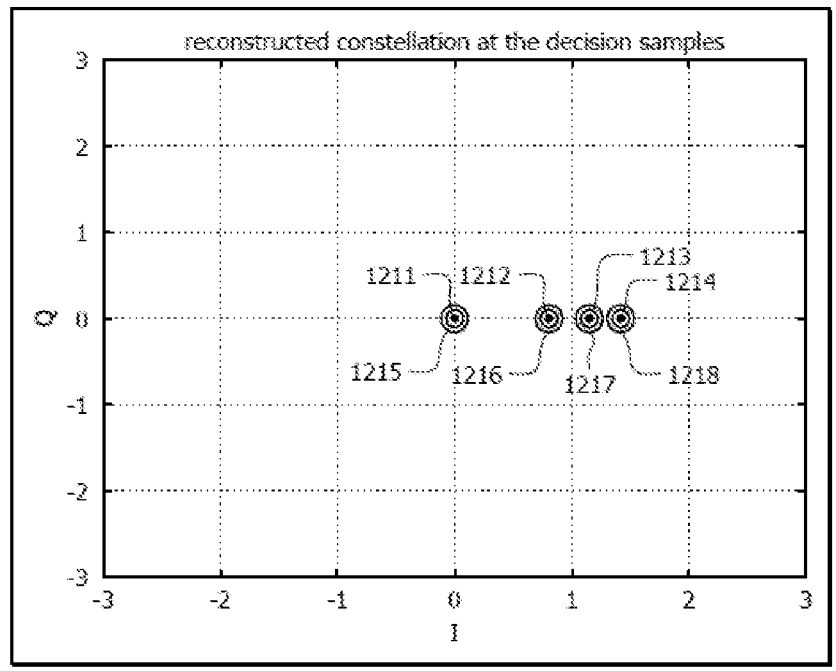
FIG. 12A is a constellation plot for a reconstructed IM signal.

FIG. 12A is a constellation plot 1210 for a reconstructed IM signal, where the reconstruction may be performed by employing similar mechanisms as described in the method 400. In the constellation plot 1210, the x-axis and the y-axis may provide similar representations as in the constellation plot 810. The points 1211, 1212, 1213, and 1214 (shown as solid dots) may represent the E-field of the reconstructed IM signal captured at the receiver, for example, at the output of the receiver's IM signal reconstruction unit, such as the IM signal reconstruction unit 265. For example, the points 1211-1214 may be reconstructed from the X-polarization points 1111-1114 and the Y-polarization points 1121-1124 by applying equation (5) described above. The constellation plot 1210 also shows the original transmitted E-field as a reference, which may be represented by the points 1215, 1216, 1217, and 1218 (shown as circles). As can be seen, the points 1211-1214 may overlay with the points 1215-1218. Thus, the receiver may recover the original transmitted data from the E-field of the reconstructed IM signal without error.

Figure 12B:
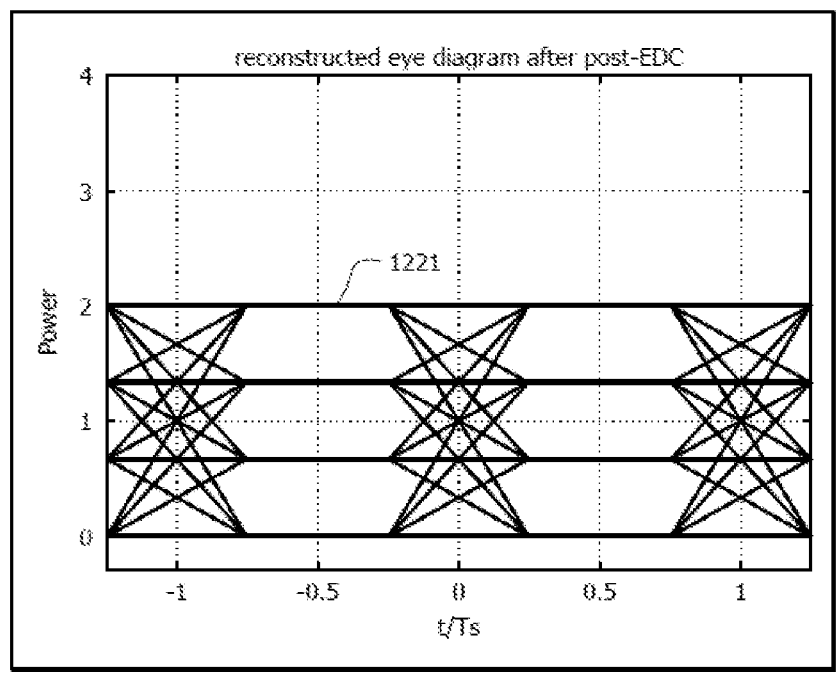
FIG. 12B is a signal eye diagram for a reconstructed IM signal.

FIG. 12B is a signal eye diagram 1220 for a reconstructed IM signal, where the reconstruction may be performed by employing similar mechanisms as described in the method 400. In the eye diagram 1220, the x-axis and the y-axis may provide similar representations as in the eye diagram 820. The eye pattern 1221 may represent the digital signal for the reconstructed IM signal captured at the output of the receiver's IM signal reconstruction unit. For example, the eye pattern 1221 may correspond to combining the X-polarization component shown in the eye pattern 1131 and the Y-polarization component shown in the eye pattern 1141 as described in equation (5). As observed in the eye diagram 1220, the eye pattern 1221 is opened and the 4 signal levels (e.g., at received power of about 0, about 0.7, about 1.4, and about 2) are clearly distinguishable. As such, the receiver may recover the original data carried in the 4-PAM signal. By comparing the eye diagrams 1220 and 820, the post-EDC effectively removes the CD effect. It should be noted that the receiver may restore the DC offsets after post-EDC and may perform matched filtering prior to the IM signal reconstruction as described in the method 400.

Figure 13A:
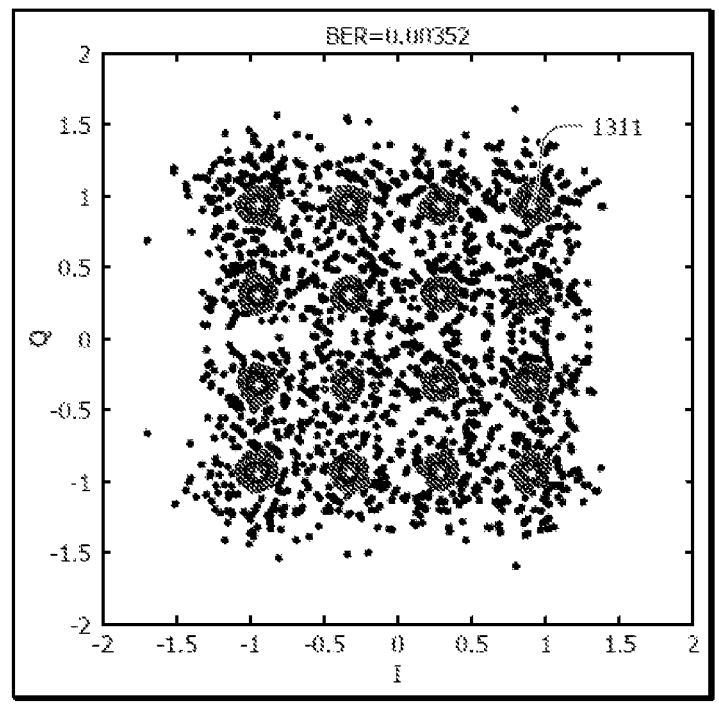
FIG. 13A is a subcarrier constellation plot for a CD-distorted orthogonal frequency division multiplexing (OFDM) signal without post-EDC.

FIG. 13A is a subcarrier constellation plot 1310 for a CD-distorted OFDM signal without post-EDC. The OFDM signal is a 40 Gbps signal with 16-QAM subcarrier modulation and may be transmitted over an optical fiber link, such as the optical fiber link 161, 162, or 163, comprising a SSMF with a dispersion coefficient of about 17 ps/nm/km and a length of about 32 km. Thus, the total amount of CD in the optical fiber link may be about 544 ps/nm. In the constellation plot 1310, the x-axis represents I components of an E-field and the y-axis represents Q components for E-field, where the x-axis and the y-axis may be in some constant units. The points 1311 may represent the E-field of the OFDM signal captured at a receiver without post-EDC. As can be seen, the points 1311 are spread out instead of tightly grouped to 16 distinct groups, thus the receiver may not be able to perform slicing correctly or recover the original data carried in the OFDM signal without error. For example, the bit error rate (BER) for the received OFDM signal may be at about 3E-4. It should be noted that OFDM employs frequency subcarrier multiplexing, where data information bits are mapped to data symbols and carried in frequency subcarriers.

Figure 13B:
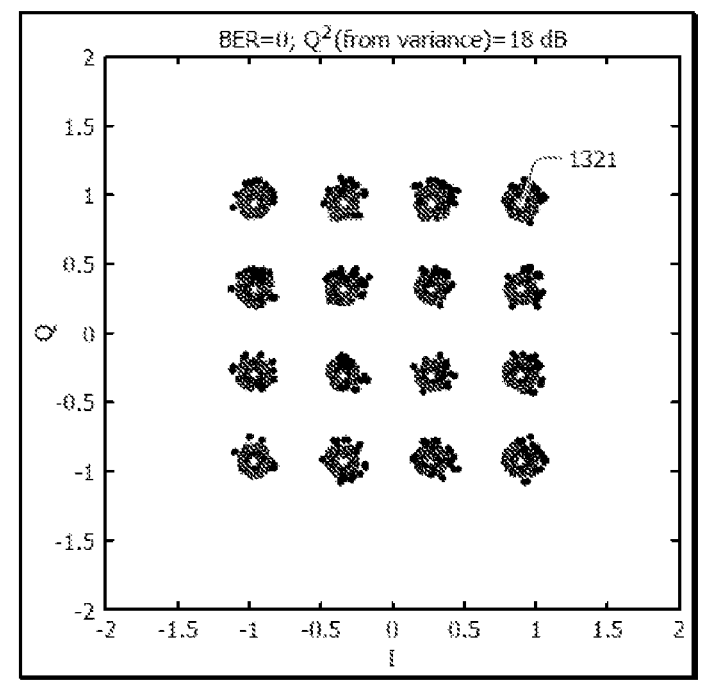
FIG. 13B is a subcarrier constellation plot for a CD-distorted OFDM signal with post-EDC.

FIG. 13B is a subcarrier constellation plot 1320 for a CD-distorted OFDM signal with post-EDC. In the constellation plot 1320, the x-axis and the y-axis may provide similar representations as in the constellation plot 1310. The points 1321 may represent the E-field of the OFDM signal captured at a receiver, such as the optical receiver 200, after post-EDC, for example, by setting $D_{post}$ to a value opposite in sign to the dispersion value of second optical transmission link (e.g., $D_{post}$=−544 ps/nm). By comparing the constellation plots 1310 and 1320, the points 1321 are tightly grouped to 16 distinct groups and separated by substantial amount of distances, thus the receiver may correctly recover the original data carried in the OFDM signal. For example, the receiver may receive the OFDM signal with a quality factor square (e.g., similar to a signal-to-noise (SNR) ratio) of about 18 dB.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Unless otherwise stated, the term "about" means±10% of the subsequent number. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:
1. An apparatus comprising:
a polarization-diversity optical hybrid that converts an optical signal into a plurality of optical signals comprising a first polarization component and a second polarization component orthogonal to the first polarization component;
one or more detectors that convert the plurality of optical signals into a plurality of first analog electrical signals comprising the first polarization component and the second polarization component;
DC blocking elements that remove DC signal components from the plurality of first analog electrical signals to output a plurality of second analog electrical signals;
one or more analog to digital converters (ADCs) that are coupled to the DC blocking elements and convert the plurality of second analog electrical signals into a plurality of digital signals; and
a digital signal processing (DSP) unit coupled to the one or more ADCs and configured to:
perform a fiber dispersion compensation on the plurality of digital signals to output a plurality of compensated digital signals; and add DC offsets to the plurality of compensated digital signals to output a plurality of DC-restored compensated digital signals.

2. The apparatus of claim 1, wherein the DSP unit is configured to perform the fiber dispersion compensation on the plurality of digital signals according to a dispersion value that is substantially opposite to a chromatic dispersion (CD) amount associated with a remote optical transmitter transmitting the optical signal.

3. The apparatus of claim 1, wherein the apparatus comprises a DC offset monitor configured to measure DC offset values for each analog electrical signal of the plurality of first analog electrical signals comprising the first polarization component and the second polarization component; wherein adding the DC offsets comprises adding the DC offsets to the first polarization component and to the second polarization component.

4. The apparatus of claim 3, wherein adding the DC offsets comprises adding a first DC offset to a first of the plurality of compensated digital signals for the first polarization component, and adding a second DC offset to a second of the plurality of compensated digital signals for the second polarization component.

5. The apparatus of claim 3, wherein the DC offset values comprise respective values for the plurality of analog electrical signals, the plurality of analog electrical signals comprising an in-phase (I) component of the first polarization component, a quadrature-phase (Q) component of the first polarization component, an I component of the second polarization component, and a Q component of the second polarization component.

6. The apparatus of claim 1, wherein the optical signal is an optical intensity-modulated (IM) signal, wherein the DSP unit is further configured to reconstruct an E-field of the optical signal after the DC offsets are added.

7. The apparatus of claim 1, wherein to perform the fiber dispersion compensation, the DSP unit is further configured to filter the plurality of digital signals with one or more static frequency domain filters in a frequency domain, the one or more static frequency domain filters each providing a dispersion effect based on a dispersion value.

8. The apparatus of claim 1, wherein the DSP unit is further configured to perform oversampling on the plurality of digital signals prior to performing the fiber dispersion compensation.

9. A method comprising:
converting an optical signal into a plurality of first analog electrical signals comprising a first polarization component and a second polarization component orthogonal to the first polarization component;
removing DC signal components from the plurality of first analog electrical signals to output a plurality of second analog electrical signals;
converting the plurality of second analog electrical signals into a plurality of digital signals;
performing a fiber dispersion compensation on the plurality of digital signals to output a plurality of compensated digital signals; and
adding DC offsets to the plurality of compensated digital signals to output a plurality of DC-restored compensated digital signals.

10. The method of claim 9, wherein the fiber dispersion compensation on the plurality of digital signals is performed according to a dispersion value that is substantially opposite to a chromatic dispersion (CD) amount associated with a remote optical transmitter transmitting the optical signal.

11. The method of claim 9, wherein the DC offsets are separately added for the first polarization component and the second polarization component in accordance with DC offset values measured based on the plurality of first analog electrical signals comprising the first polarization component and the second polarization component.

12. The method of claim 9, wherein the adding DC offsets to the plurality of compensated digital signals comprises:
adding a first DC offset to a first of the plurality of compensated digital signals for the first polarization component in accordance with the first DC offset value for the first polarization component; and
adding a second DC offset to a second of the plurality of compensated digital signals for the second polarization component in accordance with the second DC offset value for the second polarization component.

13. The method of claim 11, wherein the DC offset values comprise respective values for the plurality of analog electrical signals, the plurality of analog electrical signals comprising an in-phase (I) component of the first polarization component, a quadrature-phase (Q) component of the first polarization component, an I component of the second polarization component, and a Q component of the second polarization component.

14. The method of claim 9, wherein the optical signal is an optical intensity-modulated (IM) signal, and the method further comprises reconstructing an E-field of the optical signal after the DC offsets are added.

15. The method of claim 9, wherein the performing the fiber dispersion compensation comprises filtering the plurality of digital signals with one or more static frequency domain filters in a frequency domain, the one or more static frequency domain filters each providing a dispersion effect based on a dispersion value.

16. The method of claim 9, the method further comprising performing oversampling on the plurality of digital signals prior to performing the fiber dispersion compensation.

17. An apparatus comprising:
a frontend configured to:
convert an optical signal into a plurality of first analog electrical signals comprising a first polarization component and a second polarization component;
remove DC signal components from the plurality of first analog electrical signals to output a plurality of second analog electrical signals;
one or more analog to digital converters (ADCs) coupled to the frontend and configured to convert the plurality of second analog electrical signals into a plurality of digital signals;
a digital signal processing (DSP) unit coupled to the one or more ADCs and configured to:
perform a fiber dispersion compensation on the plurality of digital signals to output a plurality of compensated digital signals; and
add DC offsets to the plurality of compensated digital signals to output a plurality of DC-restored compensated digital signals.

18. The apparatus of claim 17, wherein the DSP unit is configured to perform the fiber dispersion compensation on the plurality of digital signals according to a dispersion value that is substantially opposite to an amount of chromatic dispersion (CD) associated with a remote optical transmitter.

19. The apparatus of claim 17, wherein the frontend comprises a DC offset monitor configured to measure DC offset values for each analog electrical signal of the plurality of first analog electrical signals comprising the first polarization component and the second polarization component; wherein adding the DC offsets comprises adding the DC offsets to the first polarization component and to the second polarization component.

20. The apparatus of claim 19, wherein the DC offset values comprise respective values for the plurality of analog electrical signals, the plurality of analog electrical signals comprising an in-phase (I) component of the first polarization component, a quadrature-phase (Q) component of the first polarization component, an I component of the second polarization component, and a Q component of the second polarization component.

* * * * *